(12) United States Patent
Kawai et al.

(10) Patent No.: US 8,380,650 B2
(45) Date of Patent: Feb. 19, 2013

(54) INFORMATION EXTRACTION RULE MAKING SUPPORT SYSTEM, INFORMATION EXTRACTION RULE MAKING SUPPORT METHOD, AND INFORMATION EXTRACTION RULE MAKING SUPPORT PROGRAM

(75) Inventors: Takao Kawai, Tokyo (JP); Shinichi Ando, Tokyo (JP)

(73) Assignee: NEC Corporation, Tokyo (JP)

( * ) Notice: Subject to any disclaimer, the term of this patent is extended or adjusted under 35 U.S.C. 154(b) by 867 days.

(21) Appl. No.: 12/524,179

(22) PCT Filed: Jan. 22, 2008

(86) PCT No.: PCT/JP2008/050823
§ 371 (c)(1),
(2), (4) Date: Jul. 23, 2009

(87) PCT Pub. No.: WO2008/093569
PCT Pub. Date: Aug. 7, 2008

(65) Prior Publication Data
US 2010/0005049 A1 Jan. 7, 2010

(30) Foreign Application Priority Data
Jan. 29, 2007 (JP) .................. 2007-018583

(51) Int. Cl.
*G06F 17/00* (2006.01)
*G06N 5/02* (2006.01)
(52) U.S. Cl. ....................................................... 706/47
(58) Field of Classification Search ......................... None
See application file for complete search history.

(56) References Cited

U.S. PATENT DOCUMENTS
2001/0042083 A1* 11/2001 Saito et al. .................... 707/517
2007/0081179 A1* 4/2007 Nishida ........................ 358/1.11

FOREIGN PATENT DOCUMENTS
| JP | 11-259524 A | 9/1999 |
| JP | 2000-132556 A | 5/2000 |
| JP | 2001-318792 | 11/2001 |
| JP | 2006-023968 | 1/2006 |
| JP | 2006-040166 A | 2/2006 |

OTHER PUBLICATIONS

Nowak et al. "Towards Modular Representation of Knowledge Base", Advances in Soft Computing 5, 2006, pp. 421-428.* Takashi Okada; "Active Mining no Tame no Rule-gun Hyogen-go"; Jinko Chino Kenkyukai Shiryo, Nov. 12, 2001, pp. 219-224, Special Internet Group on Foundation of Artificial Intelligence (Dai 46 Kai) Special Internet Group on Knowledge-based Softwave (Dai 54 Kai).

* cited by examiner

*Primary Examiner* — Jeffrey A Gaffin
*Assistant Examiner* — Li-Wu Chang
(74) *Attorney, Agent, or Firm* — Dickstein Shapiro LLP

(57) ABSTRACT

A information extraction rule making support system comprises: a storage section for storing an extraction object document, which is an electronic document of an information extraction object; an input unit for inputting a plurality of extraction rules, which are rules used to extract information from said extraction object document; an information extraction section for respectively deriving extraction results matching each of said extraction rules from said extraction object document stored by said storage section, using each of said extraction rules inputted by said input means; and a rule relation creating section for creating a rule relation network indicating a relation between each of said extraction rules by analyzing an overlapping relation or including relation between extraction results derived by said information extraction section and linking each of said extraction rules based on the result of the analysis.

18 Claims, 24 Drawing Sheets

AN EXAMPLE OF A CONCRETE SYNTAX TREE OBTAINED BY PERFORMING SYNTACTIC ANALYSIS ON THE ORIGINAL SENTENCE "NEC HAS DEVELOPED AN ACCOUNTING SYSTEM."

FIG. 12

| ORIGINAL FORM | ACCOUNTING SYSTEM | WO | NEC | GA | ... |
|---|---|---|---|---|---|
| PART OF SPEECH | NOUN | PARTICLE | NOUN | PARTICLE | ... |
| PRONUNCIATION | KAIKEI SHISUTEMU | WO | ENU-I-SHI | GA | ... |
| MEANING CATEGORY | ARTIFICAL MATTER | | ORGANIZATION | | ... |

FIG. 13

| EXTRACTION OBJECT DOCUMENT ID | FILE NAME |
|---|---|
| 1 | /data/ABC |
| 2 | /data/DEF |
| ... | ... |

FIG. 14

```
#EXTRACTION RULE ID:1
[ORIGINAL FORM="DEVELOPED"] {
    [ORIGINAL FORM="WO"] {[PART OF SENTENCE="*", EXTRACT="ON"]},
    [ORIGINAL FORM="GA"] {[ORIGINAL FORM="NEC"]}
}
```

FIG. 15

| EXTRACTION RULE ID | EXTRACTION RULE CONTENTS |
|---|---|
| 1 | ~ |
| 2 | ~ |
| ... | ... |

FIG. 16

| EXTRACTION RESULT ID | EXTRACTION OBJECT DOCUMENT ID | START POSITION | END POSITION | EXTRACTION CONTENTS | EXTRACTION RULE ID |
|---|---|---|---|---|---|
| 1 | 1 | 10 | 16 | ~ | 1, 3, 4 |
| 2 | 1 | 20 | 24 | ~ | 2, 4, 11 |
| ... | ... | ... | ... | ... | ... |

FIG. 17

| EXTRACTION RULE ID | EXTRACTION RESULT ID | EXTRACTION RULE CONTENTS |
|---|---|---|
| 1 | 1 | ～ |
| 2 | 2, 4 | ～ |
| 3 | 1, 3, 5, 6 | ～ |
| 4 | 1, 2, 3, 4, 5, 6 | ～ |
| ... | ... | ... |

FIG. 18

| LINK ID | EXTRACTION RULE X | EXTRACTION RULE Y | COMMON EXTRACTION RESULT ID | DIFFERENTIAL EXTRACTION RESULT ID |
|---|---|---|---|---|
| 1 | R | 1 |  | 1 |
| 2 | 1 | 3 | 1 | 3, 5, 6 |
| 3 | 1 | 4 | 1 | 2, 3, 4, 5, 6 |
| 4 | 3 | 4 | 1, 3, 5, 6 | 2, 4 |
| 5 | R | 2 |  | 2, 4 |
| 6 | 2 | 4 | 2, 4 | 1, 3, 5, 6 |
| ... | ... | ... | ... | ... |

FIG. 22

| EXTRACTION RULE ID | EXTRACTION RESULT ID | ACCEPTED? | EXTRACTION RULE CONTENTS |
|---|---|---|---|
| 1 | 1 | | ～ |
| 2 | 2, 4 | | ～ |
| 3 | 1, 3, 5, 6 | | ～ |
| 4 | 1, 2, 3, 4, 5, 6 | | ～ |
| ... | ... | | ... |

FIG. 23

| LINK ID | EXTRACTION RULE X | EXTRACTION RULE Y | SELECTION SCORE | CHECKED |
|---|---|---|---|---|
| 1 | R | 1 | 0 | 0 |
| 2 | 1 | 3 | 3 | 0 |
| 4 | 3 | 4 | 1.5 | 0 |
| 5 | R | 2 | 0 | 0 |
| 6 | 2 | 4 | 2 | 0 |
| ... | ... | ... | ... | ... |

FIG. 25

NEW INSTRUCTION INFORMATION INPUT SCREEN
(EXTRACTION OBJECT SELECTION SCREEN)

PLEASE SELECT NEW EXTRACTION OBJECTS.

| SELECT | EXTRACTION OBJECT CONTENTS | DOCUMENT ID |
|---|---|---|
| ☐ | …WE ARE PLANNING TO SELL A <u>NEW TYPE IP TELEPHONE SYSTEM</u> IN JANUARY… | 3 |
| ☐ | …HERETOFORE, WE HAVE DEVELOPED <u>CORPORATE INFORMATION SHARING SYSTEMS</u>… | 10 |
| ☐ | …CONSIDERING TO INCORPORATE A <u>TV CONFERENCE SYSTEM</u> TO REDUCE… | 21 |

CONFIRM

INFORMATION EXTRACTION RULE MAKING SUPPORT SYSTEM, INFORMATION EXTRACTION RULE MAKING SUPPORT METHOD, AND INFORMATION EXTRACTION RULE MAKING SUPPORT PROGRAM

REFERENCE TO RELATED APPLICATIONS

This application is based upon and claims the benefit of the priority of Japanese patent application No. 2007-018583 filed on Jan. 29, 2007, the disclosure of which is incorporated herein in its entirety by reference thereto.

The present invention relates to an information extraction rule making support system, information extraction rule making support method, and information extraction rule making support program, and particularly to an information extraction rule making support system, information extraction rule making support method, and information extraction rule making support program that support creation of an extraction rule for extracting information.

TECHNICAL FIELD

Background Art

There is an increasing importance of information extraction systems that extract only desired information from a large amount of electronic documents. In the information extraction system, several methods are known. Conventionally, in this kind of an information extraction system, it is common to create an extraction rule that extracts information desired by the user in order to extract unique expressions such as predefined names of people, places, or organizations, and extract information from electronic documents, which are the extraction objects, according to this created extraction rule.

Further, in another information extraction system, for instance as described in Patent Document 1, a large amount of teacher data (a correct answer list) including information, in which desired information is written as a positive example, is prepared in advance, and an extraction rule for extracting unique expressions is generated from the teacher data by machine learning.

Further, for instance as described in Patent Document 2, another information extraction device supports the creation of teacher data when an extraction rule for extracting unique expressions is generated. In order to achieve this, unique expressions that the user wants to extract are inputted in a first user input as a positive example. Further, words different from those of the first user input are presented as candidates for a negative example, and a selected part of these words are inputted as a second user input. Then the positive example of the first user input and the negative example of the second user input are used as the teacher data, and extraction rules that extract unique expressions are generated by learning a certain regularity from the teacher data. Further, extraction results obtained by applying the generated extraction rules to electronic documents are presented, judging results indicating whether or not these results are the unique expressions are inputted as a third user input, and the extraction rules that extract unique expressions are individually sorted.

PATENT DOCUMENT 1

Japanese Patent Kokai Publication No. JP-P2001-318792A

PATENT DOCUMENT 2

Japanese Patent Kokai Publication No. JP-P2006-023968A

SUMMARY

The entire disclosures of the above-mentioned Patent Documents 1 and 2 are incorporated herein by reference thereto.

The information extraction system described in Patent Document 1 requires to have an enormous amount of the teacher data prepared. Further, since the teacher data is manually created, an enormous amount of labor is required to create the teacher data. Meanwhile, the information extraction device described in Patent Document 2 supports sequential input of the teacher data, however, the device still requires a large amount of the teacher data and input.

As described, in the conventional information extraction system (device), when the extraction rules are manually created, the operation requires time since extraction rule candidates are created and each extraction rule needs to be tested as to whether or not it can obtain desired extraction results. Further, even when the creation of the extraction rules is automated, a large amount of the teacher data corresponding to desired information needs to be created. Furthermore, in order to create the extraction rules that extract desired information, even if the method that supports the creation of the teacher data by sequentially inputting the teacher data is used, it does not change the fact that a large amount of input is required. Therefore the conventional information extraction system (device) has a problem that it cannot support efficient creation of extraction rules that extract information.

Therefore, it is an object of the present invention to provide an information extraction rule making support system, information extraction rule making support method, and information extraction rule making support program that realize a function of supporting efficient making of an extraction rule to extract desired information without previously inputting a large amount of teacher data.

According to a first aspect of the present invention, there is provided an information extraction rule making support system comprising a storage section (for instance, realized by extraction object document storage section 20) for storing an extraction object document, which is an electronic document of an information extraction object; an input section (for instance, realized by extraction rule input section 10) for inputting a plurality of extraction rules, which are rules used to extract information from the extraction object document; information extraction section (for instance, realized by extraction rule applying section 11) for respectively deriving extraction results matching each of the extraction rules from the extraction object document stored by the storage section, using each of the extraction rules inputted by the input section; and rule relation creating section (for instance, realized by rule relation creating section 12) for creating a rule relation network (information on relations between extraction rules) indicating a relation between each of the extraction rules by analyzing an overlapping relation or including relation between extraction results derived by the information extraction section and linking each of the extraction rules based on the result of the analysis.

Further, according to a second aspect of the present invention, there is provided an information extraction rule making support system comprising a storage section (for instance, realized by the extraction object document storage section 20) for storing an extraction object document, which is an electronic document of an information extraction object; an input section (for instance, realized by extraction rule creating section 14) for inputting an document used to create extraction rules, which is an electronic document used to create extraction rules used to extract information from the extraction object document, and instruction information indicating an extraction place in the document used to create extraction rules; extraction rule creating section (for instance, realized by the extraction rule creating section 14) for creating a plurality of extraction rules used to extract information of an extraction place specified by the instruction information, based on the document used to create extraction rules and the instruction information inputted by the input section; information extraction section (for instance, realized by the extraction rule applying section 11) for respectively deriving extraction results matching each of the extraction rules from the extraction object document stored by the storage section, using each of the extraction rules created by the extraction rule creating section; and rule relation creating section (for instance, realized by the rule relation creating section 12) for creating a rule relation network indicating a relation between each of the extraction rules by analyzing an overlapping relation or including relation between extraction results derived by the information extraction section, and linking each of the extraction rules based on the result of the analysis.

Further, in each of the information extraction rule making support systems, the rule relation creating section may derive an overlapping ratio indicating an overlapping relation between each of extraction results by analyzing an overlapping relation between the extraction results derived by the information extraction means, and link corresponding extraction rules based on the overlapping ratio derived.

Further, in each of the information extraction rule making support systems, the rule relation creating section may link corresponding extraction rules only when there is any including relation between each of extraction results derived by the information extraction means.

Further, each of the information extraction rule making support systems may comprise output means (for instance, realized by rule relation an output section 13) for outputting the rule relation network created by the rule relation creating section, as rule relation information indicating relations between extraction rules.

Further, each of the information extraction rule making support systems may comprise output means (for instance, realized by the rule relation an output section 13) for outputting the rule relation network created by the rule relation creating section and information showing differences between extraction results corresponding to extraction rules linked in the rule relation network, as rule relation information indicating relations between extraction rules.

Further, each of the information extraction rule making support systems may comprise extraction rule narrowing section (for instance, realized by extraction rule narrowing section 15) for narrowing down extraction rules; and the extraction rule narrowing section may select a link, included in the rule relation network created by the rule relation creating section, based on predetermined priority; create presentation information including results extracted by performing information extraction using each extraction rule corresponding to the selected link; input judgment information indicating acceptability of each extraction result included in the presentation information; and judge the acceptability of at least one extraction rule based on the judgment information inputted and the rule relation network.

Further, each of the information extraction rule making support systems may comprise extraction rule narrowing section for narrowing down extraction rules; and the extraction rule narrowing section may select a link, included in the rule relation network created by the rule relation creating section, based on predetermined priority; create presentation information including at least information of results extracted using an extraction rule extracting more results when information extraction is performed using this extraction rule and not results extracted using another extraction rule extracting fewer results when information extraction is performed using this extraction rule, out of extraction rules corresponding to the selected link; input judgment information indicating the acceptability of each extraction result included in the presentation information; and judge the acceptability of at least one extraction rule based on the judgment information inputted and the rule relation network.

Further, in each of the information extraction rule making support systems, the extraction rule narrowing section may select an extraction rule based on the proportion of the number of extraction results corresponding to extraction rules linked in the rule relation network created by the rule relation creating section.

Further, in each of the information extraction rule making support systems, the extraction rule narrowing section may select an extraction rule based on the number of descendant nodes of extraction rules linked in the rule relation network created by the rule relation creating section.

Further, in each of the information extraction rule making support systems, the extraction rule narrowing section may select an extraction rule based on the proportion of the number of extraction results corresponding to extraction rules linked in the rule relation network created by the rule relation creating section, and a score value calculated using the number of descendant nodes of extraction rules linked in the rule relation network.

Further, each of the information extraction rule making support systems may comprise information selecting means for selecting information, different from information of an extraction place specified by instruction information in the past, from results extracted by performing information extraction using extraction rules judged acceptable by the extraction rule narrowing section; and the information selecting means may have a function of outputting an extraction object document including the selected information and information from which an extraction object document that includes the selected information can be specified.

According to a third aspect of the present invention, there is provided an information extraction rule making support method including storing an extraction object document, which is an electronic document of an information extraction object, in a storage unit (for instance, a storage unit 2); inputting a plurality of extraction rules, which are rules used to extract information from the extraction object document; respectively deriving extraction results matching each of the extraction rules from the extraction object document stored by the storage unit, using each of the extraction rules inputted; and creating a rule relation network indicating a relation between each of the extraction rules by analyzing an overlapping relation or including relation between extraction results derived and linking each of the extraction rules based on the result of the analysis.

Further, according to a fourth aspect of the present invention, there is provided an information extraction rule making support method comprising: storing an extraction object document, which is an electronic document of an information extraction object, in a storage unit; inputting an document used to create extraction rules, which is an electronic document used to create extraction rules used to extract information from the extraction object document, and instruction information indicating an extraction place in the document used to create extraction rules; creating a plurality of extraction rules used to extract information of an extraction place specified by the instruction information, based on the document used to create extraction rules and the instruction information inputted; respectively deriving extraction results matching each of the extraction rules from the extraction object document stored by the storage unit, using each of the extraction rules created; and creating a rule relation network indicating a relation between each of the extraction rules by analyzing an overlapping relation or including relation between extraction results derived and linking each of the extraction rules based on the result of the analysis.

Further, in each of the information extraction rule making support methods, when the rule relation network is created, an overlapping ratio indicating an overlapping relation between each of extraction results may be derived by analyzing an overlapping relation between the extraction results derived, and corresponding extraction rules may be linked based on the overlapping ratio derived.

Further, in each of the information extraction rule making support methods, when the rule relation network is created, corresponding extraction rules may be linked only if there is any including relation between each of extraction results derived.

Further, each of the information extraction rule making support methods may comprise: outputting the rule relation network created as rule relation information indicating relations between extraction rules.

Further, each of the information extraction rule making support methods may comprise: outputting the rule relation network created and information showing differences between extraction results corresponding to extraction rules linked in the rule relation network as rule relation information indicating relations between extraction rules.

Further, each of the information extraction rule making support methods may comprise: narrowing down extraction rules; and when extraction rules are narrowed down, a link included in the rule relation network created may be selected based on predetermined priority; presentation information including results extracted by performing information extraction using each extraction rule corresponding to the selected link may be created; judgment information indicating the acceptability of each extraction result included in the presentation information may be inputted; and the acceptability of at least one extraction rule may be judged based on the judgment information inputted and the rule relation network.

Further, each of the information extraction rule making support methods may comprise: narrowing down extraction rules; and when extraction rules are narrowed down, a link included in the rule relation network created may be selected based on predetermined priority; presentation information including at least information of results extracted using an extraction rule extracting more results when information extraction is performed using this extraction rule and not results extracted using another extraction rule extracting fewer results when information extraction is performed using this extraction rule, out of extraction rules corresponding to the selected link, may be created; judgment information indicating the acceptability of each extraction result included in the presentation information may be inputted; and the acceptability of at least one extraction rule may be judged based on the judgment information inputted and the rule relation network.

Further, in each of the information extraction rule making support methods, when extraction rules are narrowed down, an extraction rule may be selected based on the proportion of the number of extraction results corresponding to extraction rules linked in the rule relation network created.

Further, in each of the information extraction rule making support methods, when extraction rules are narrowed down, an extraction rule may be selected based on the number of descendant nodes of extraction rules linked in the rule relation network created.

Further, in each of the information extraction rule making support methods, when extraction rules are narrowed down, an extraction rule may be selected based on the proportion of the number of extraction results corresponding to extraction rules linked in the rule relation network created and a score value calculated using the number of descendant nodes of extraction rules linked in the rule relation network.

Further, each of the information extraction rule making support methods may comprise: selecting information, different from information of an extraction place specified by instruction information in the past, from results extracted by performing information extraction using extraction rules judged acceptable; and when the information is selected, an extraction object document including the selected information and information from which an extraction object document that includes the selected information can be specified may be outputted.

According to a fifth aspect of the present invention, there is provided an information extraction rule making support program having a computer, comprising a storage unit (for instance, the extraction object document storage section 20 of the storage unit 2) for storing an extraction object document, which is an electronic document of an information extraction object, perform inputting a plurality of extraction rules, which are rules used to extract information from the extraction object document; respectively deriving extraction results matching each of the extraction rules from the extraction object document stored by the storage means, using each of the extraction rules inputted; and creating a rule relation network indicating a relation between each of the extraction rules by analyzing an overlapping relation or including relation between extraction results derived and linking each of the extraction rules based on the result of the analysis.

According to a sixth aspect of the present invention, there is provided an information extraction rule making support program having a computer, comprising a storage unit (for instance, the extraction object document storage section 20 of the storage unit 2) for storing an extraction object document, which is an electronic document of an information extraction object, perform: inputting an document used to create extraction rules, which is an electronic document used to create extraction rules used to extract information from the extraction object document, and instruction information indicating an extraction place in the document used to create extraction rules; creating a plurality of extraction rules used to extract information of an extraction place specified by the instruction information, based on the document used to create extraction rules and the instruction information inputted; respectively deriving extraction results matching each of the extraction rules from the extraction object document stored by the storage unit, using each of the extraction rules created; and creating a rule relation network indicating a relation between each of the extraction rules by analyzing an overlapping relation or including relation between extraction results derived and linking each of the extraction rules based on the result of the analysis.

By employing the configurations described above in which a plurality of extraction rules are inputted and the rule relation information is outputted, extraction rules used to extract desired information are easily confirmed based on relations between the extraction rules, achieving the object of the present invention to make it possible to efficiently support the creation of the extraction rules.

According to the present invention, since the information extraction means for deriving extraction results based on a plurality of extraction rules and an extraction object document, and the rule relation creating section for creating the rule relation network by comparing each of extraction results derived between the extraction rules and analyzing an overlapping relation or including relation between the extraction rules satisfying a predetermined condition are provided, the relations between the extraction rules, along with the extraction results, are easily grasped. Therefore, it becomes possible to narrow down the extraction rules for extracting desired information simply by inputting a plurality of extraction rule candidates. As a result, without inputting a large amount of teacher data, the creation of the extraction rules used to extract desired information is efficiently supported.

BRIEF DESCRIPTION OF THE DRAWINGS

FIG. 12 is an explanation diagram showing an example of an attribute and attribute value for each morpheme.

FIG. 13 is an explanation diagram showing an example of an extraction object document.

FIG. 14 is an explanation diagram showing an example of a format of the extraction rule.

FIG. 15 is an explanation diagram showing an example of a case where an extraction rule ID is given to and associated with an extraction rule.

FIG. 16 is an explanation diagram showing an example of extraction results of information extraction using the extraction rules.

FIG. 17 is an explanation diagram showing an example of a case where the extraction results are managed while an extraction result ID is associated with each extraction rule ID.

FIG. 18 is an explanation diagram showing the data of a rule relation network.

FIG. 22 is an explanation diagram showing an example of a case where the extraction results are managed while being accompanied by information pertaining the acceptability of each extraction rule.

FIG. 23 is an explanation diagram showing an example of the rule relation information with the selection score of each link and a flag indicating whether or not each link has been checked.

FIG. 25 is an explanation diagram showing an example of a screen that presents the extraction object information.

PREFERRED MODES

Mode 1

Figure 1:
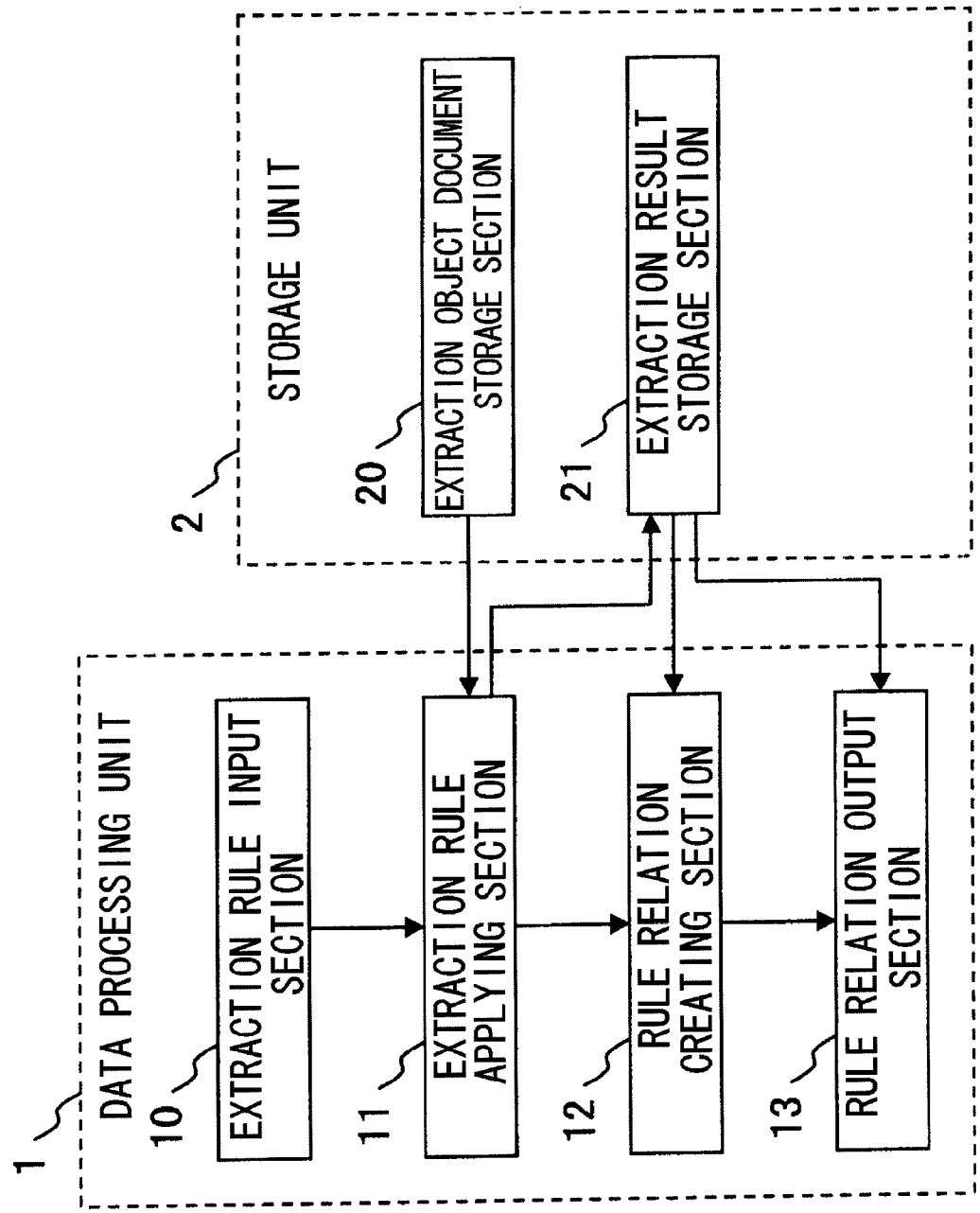
FIG. 1 is a block diagram showing a configuration example of an information extraction rule making support system according to the present invention.

A first mode of the present invention will be described with reference to the drawing. FIG. 1 is a block diagram showing a configuration example of an information extraction rule making support system according to the present invention. Note that the information extraction rule making support system is used to support the creation of an extraction rule for extracting desired information from electronic documents. Further, the information extraction rule making support system can be applied to the use of, for instance, an information extraction system that efficiently extracts information desired by the user from electronic documents and an information search system that searches for information desired by the user.

As shown in FIG. 1, the information extraction rule making support system includes a data processing unit 1 operated by program control and the storage unit 2 that stores data.

More concretely, the storage unit 2 is realized by a magnetic disk device or an optical disk device. As shown in FIG. 1, the storage unit 2 includes the extraction object document storage section 20 and an extraction result storage section 21. Further, regarding each storage section of the extraction object document storage section 20 and the extraction result storage section 21, different storage devices may be used for each of the sections rather than using one storage device for both of them.

The extraction object document storage section 20 stores at least one electronic document to be an information extraction object as an extraction object document. Note that data input means (not shown in the drawing) may be provided for the data processing unit 1 or for an external device in order to input the extraction object document to the extraction object document storage section 20, and the extraction object document may be inputted in advance using the data input means (for instance, a keyboard and a mouse). Further, when an extraction rule is inputted using the extraction rule input section 10, the extraction object document may be inputted simultaneously.

The extraction result storage section 21 creates an association between an extraction result extracted by the extraction rule applying section 11 and an extraction rule corresponding to this extraction result (the extraction rule used for obtaining this extraction result) and stores them.

Concretely, the data processing unit 1 is realized by an information processing unit such as a personal computer operated according to a program. As shown in FIG. 1, the data processing unit 1 includes the extraction rule input section 10, the extraction rule applying section 11, the rule relation creating section 12, and the rule relation output section 13. In a summary, these sections 10 to 13 operate as follows.

The extraction rule input section 10 comprises a function of receiving a plurality of extraction rule candidates (a plurality of extraction rules in the works) as inputs. For instance, the extraction rule input section 10 receives an input of a plurality of extraction rule candidates from input units such as a keyboard and mouse according to an input operation performed by the user. Further, for instance, the extraction rule input section 10 receives an input of files and data including extraction rule candidates.

The extraction rule applying section 11 comprises a function of applying each extraction rule received to the extraction object documents stored in the extraction object document storage section 20 of the storage unit 2 and extracting information. Further, the extraction rule applying section 11 comprises a function of having the extraction result storage section 21 of the storage unit 2 store the extracted information as an extraction result. Further, the extraction rule applying section 11 may hand (output) the extraction result to the rule relation creating section 12 as it is.

The rule relation creating section 12 comprises a function of comparing the extraction result of each extraction rule between the extraction rules based on the extraction results extracted by the extraction rule applying section 11. Further, the rule relation creating section 12 comprises a function of creating rule relation information indicating the relation between the extraction rules based on the comparison results between the extraction rules satisfying a predetermined condition.

Further, the rule relation creating section 12 analyzes overlapping and including relations between the extraction results derived by the extraction rule applying section 11 and creates a rule relation network (relation information between the extraction rules) indicating relations between the extraction rules by linking each extraction rule based on the result of the analysis. For instance, the rule relation creating section 12 analyzes overlapping relations between the extraction results derived by the extraction rule applying section 11, derives an overlapping ratio indicating the overlapping relations between the extraction results, and links corresponding extraction rules based on the overlapping ratio derived. Further, for instance, the rule relation creating section 12 links corresponding extraction rules only when there is an including relation between the extraction results derived by the extraction rule applying section 11.

The rule relation output section 13 comprises a function of outputting the rule relation information created by the rule relation creating section 12. For instance, the rule relation output section 13 displays the rule relation information on a display device such as a display screen device. Further, the rule relation output section 13 outputs the rule relation information to a printing device such as a printer.

Further, the rule relation output section 13 outputs, for instance, the rule relation network created by the rule relation creating section 12 as the rule relation information indicating the relations between the extraction rules. Further, the rule relation output section 13 outputs, for instance, the rule relation network created by the rule relation creating section 12 and information indicating differences between the extraction results corresponding to the extraction rules linked in the rule relation network as the rule relation information indicating the relations between the extraction rules. Further, the rule relation output section 13 may output the rule relation information as electronic data.

Further, in the present mode, a storage section (not shown in the drawing) of the data processing unit 1 stores various programs that perform processings that support the creation of the extraction rules. For instance, the storage section of the data processing unit 1 stores an information extraction rule making support program that performs input processing that inputs a plurality of extraction rules that extract information from the extraction object documents to a computer, information extraction processing that respectively derives an extraction result matching each extraction rule from the extraction object documents stored by storing means using each extraction rule inputted, and rule relation creating processing that analyzes overlapping or including relations between the extraction results derived and creates the rule relation network indicating the relations between the extraction rules by linking each extraction rule based on the results of the analysis.

Figure 2:
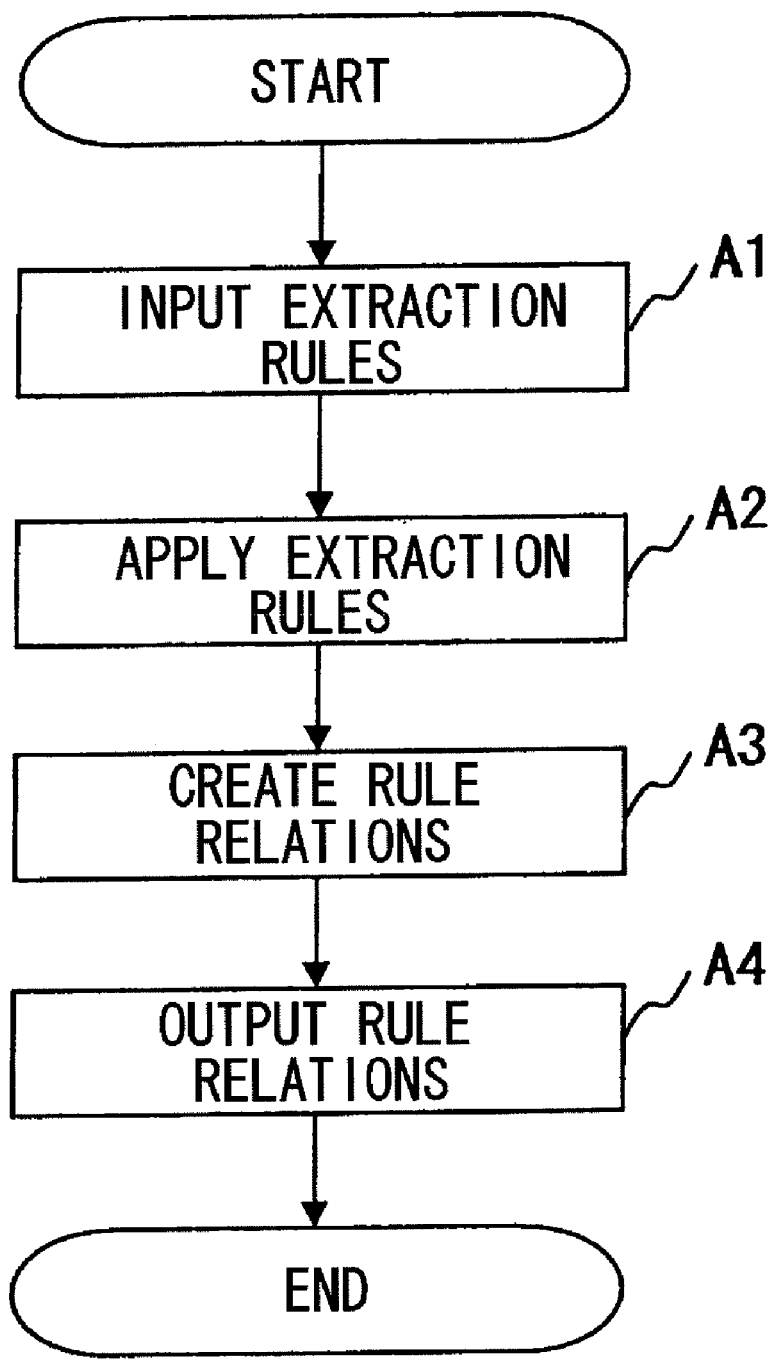
FIG. 2 is a flowchart showing an example of processing supporting the creation of extraction rules performed by the information extraction rule making support system.

Next, the operation will be described. FIG. 2 is a flowchart showing an example of processing supporting the creation of the extraction rules performed by the information extraction rule making support system. First, the user performs an instructive operation in order to utilize the function supporting the creation of the extraction rules when he creates the extraction rules using the information extraction rule making device. Then the extraction rule input section of the data processing unit 1 receives a plurality of extraction rule candidates as an input according to the operation performed by the user (step A1 in FIG. 2), and transfers (outputs) them to the extraction rule applying section 11. In this case, for instance, the extraction rule input section 10 may have the storage unit 2 store the plurality of extraction rule candidates, and hands (outputs) instruction information, from which the extraction rule candidates can be specified, to the extraction rule applying section 11.

Next, the extraction rule applying section 11 receives (an input of) the extraction rules from the extraction rule input section 10, applies the extraction rules to the extraction object documents stored in the extraction object document storage section 20 of the storage unit 2, and extracts corresponding information from the extraction object documents according to each of the extraction rules (step A2 in FIG. 2). In this case, for instance, when there is information matching a condition in an extraction rule, the extraction rule applying section 11 extracts this information from the extraction object document. Then the extraction rule applying section 11 creates an association between the extraction rule used to extract the information and the extracted information, and has the extraction result storage section 21 store them as an extraction result.

Next, the rule relation creating section 12 in FIG. 1 reads out the extraction results stored in the extraction result storage section 21, and compares the extraction results between the extraction rules based on the extraction result of each extraction rule. In this comparison processing, the rule relation creating section 12 analyzes overlapping relations between the extraction results, and creates the rule relation network that links the extraction rules satisfying a predetermined condition when there is any overlapping relation. Then the rule relation creating section 12 creates the rule relation information including information on associations between the data of the rule relation network and the extraction results (step A3 in FIG. 2).

An example of the predetermined condition may be, for instance, a case where the extraction result of an extraction rule is included in the extraction result of another extraction rule. Although only one example of the predetermined condition is presented in the present mode, the predetermined condition is not limited to the condition described in the present mode and conditions other than the including relation may be used.

Next, the rule relation output section 13 outputs the rule relation information created by the rule relation creating section 12 (step A4 in FIG. 2). In this case, the rule relation output section 13 may output (display) the rule relation information using an output device such as a display device. Further, the rule relation output section 13 may have the storage unit 2 store the rule relation information. When having the storage unit 2 store the rule relation information, the rule relation output section 13 may sequentially output a part of the rule relation information in response to an instruction from an external input unit.

When the rule relation information is outputted (for instance displayed), the user can create an extraction rule referring to the outputted rule relation information. For instance, it is possible to create, modify, and delete the extraction rules based on the rule relation information by operating an information rule creating device (realized by, for instance, an information processing device such as a personal computer) that creates, modifies, and deletes extraction rules according to an operation performed by the user. Further, once the extraction rules are completed, the user is able to instruct and perform information extraction from the extraction object documents (electronic documents) by operating an information extraction device (realized by, for instance, an information processing device such as a personal computer). Then, according to the operation performed by the user, the information extraction device extracts information desired by the user from the extraction object documents (electronic documents) based on the extraction rules created by the information rule creating device.

As described, according to the present mode, the information extraction rule making support system has the extraction rule applying section 11 that obtains (derives) extraction results based on a plurality of extraction rule candidates and extraction object documents. Further, the information extraction rule making support system has the rule relation creating section 12 that compares the obtained extraction results between the extraction rules, and that creates the rule relation information in which the extraction results are associated with data on the rule relation network indicating overlapping or including relations between the extraction rules satisfying a predetermined condition. Further, the information extraction rule making support system outputs the rule relation information created. As a result, the user is able to grasp the relations between the extraction rules along with the extraction results. Therefore, without inputting a large amount of teacher data in advance, the confirmation by the user at the time of extraction rule creation is facilitated and the creation of extraction rules can be efficiently supported by simply inputting a plurality of extraction rule candidates.

Mode 2

Figure 3:
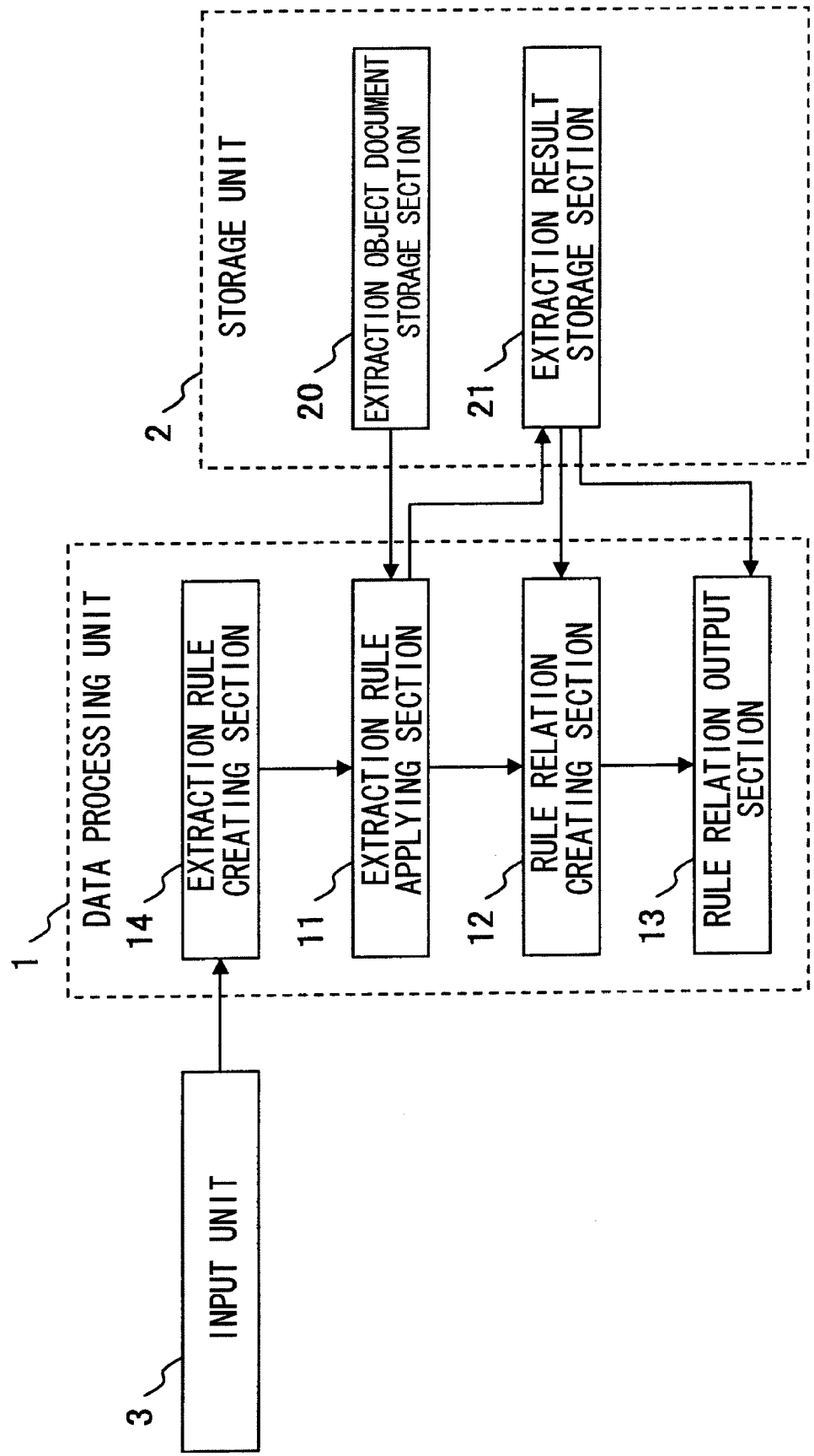
FIG. 3 is a block diagram showing a configuration example of an information extraction rule making support system in a second mode.

Next, a second mode of the present invention will be described with reference to the drawings. FIG. 3 is a block diagram showing a configuration example of an information extraction rule making support system in the second mode. As shown in FIG. 3, the present mode is different from the first mode in that the information extraction rule making support system has an input unit 3 (for instance a keyboard and mouse) in addition to the constituent elements shown in FIG. 1. Further, the present mode is different from the first mode in that the data processing unit 1 has the extraction rule creating section 14 in addition to the constituent elements shown in FIG. 1. Further, the present mode is different from the first mode in that the data processing unit 1 does not have the extraction rule input section 10, one of the constituent elements shown in FIG. 1.

In the present mode, the extraction rule creating section 14 comprises a function of receiving instruction information including a document for creating extraction rules, which is an electronic document used for creating extraction rules, and information that specifies an extraction place in the document for creating extraction rules, from the input unit 3 as an input according to an operation performed by the user.

The extraction rule creating section 14 may receive instruction information including not the document for creating extraction rules, but information that specifies an extraction object document stored in the extraction object document storage section 20 and information that specifies an extraction place in this extraction object document as an input.

Further, the extraction rule creating section 14 may receive instruction information including information that specifies a particular extraction object document out of the extraction object documents stored in the extraction object document storage section 20. Then the extraction rule applying section 11 may use the extraction object document specified in the instruction information as the extraction object.

Further, the input unit 3 may be a part of the data processing unit 1 (for instance as an input/output interface section).

Further, having received (an input of) the instruction information from the input unit 3, the extraction rule creating section 14 comprises a function of creating a plurality of extraction rules that extract information from the extraction place based on the document for creating extraction rules and the information that specifies the extraction place included in the instruction information inputted. Further, the extraction rule creating section 14 comprises a function of handing (outputting) the extracted extraction rules to the extraction rule applying section 11. Note that the extraction rules created by the extraction rule creating section 14 become candidates for extraction rules that extract information desired by the user.

Further, the extraction rule creating section 14 may store the extraction rules created in the storage unit 2 and notify to the extraction rule applying section 11 that it has done so. Further, when the extraction rule creating section 14 receives the instruction information including the information that specifies an extraction object document stored in the extraction object document storage section 20 and the information that specifies an extraction place in this extraction object document, the extraction rule creating section 14 may use the specified extraction object document stored in the extraction object document storage section 20 as the document for creating extraction rules.

Note that the functions of the constituent elements other than the extraction rule creating section 14 in the information extraction rule making support system are the same as their functions described in the first mode.

Figure 4:
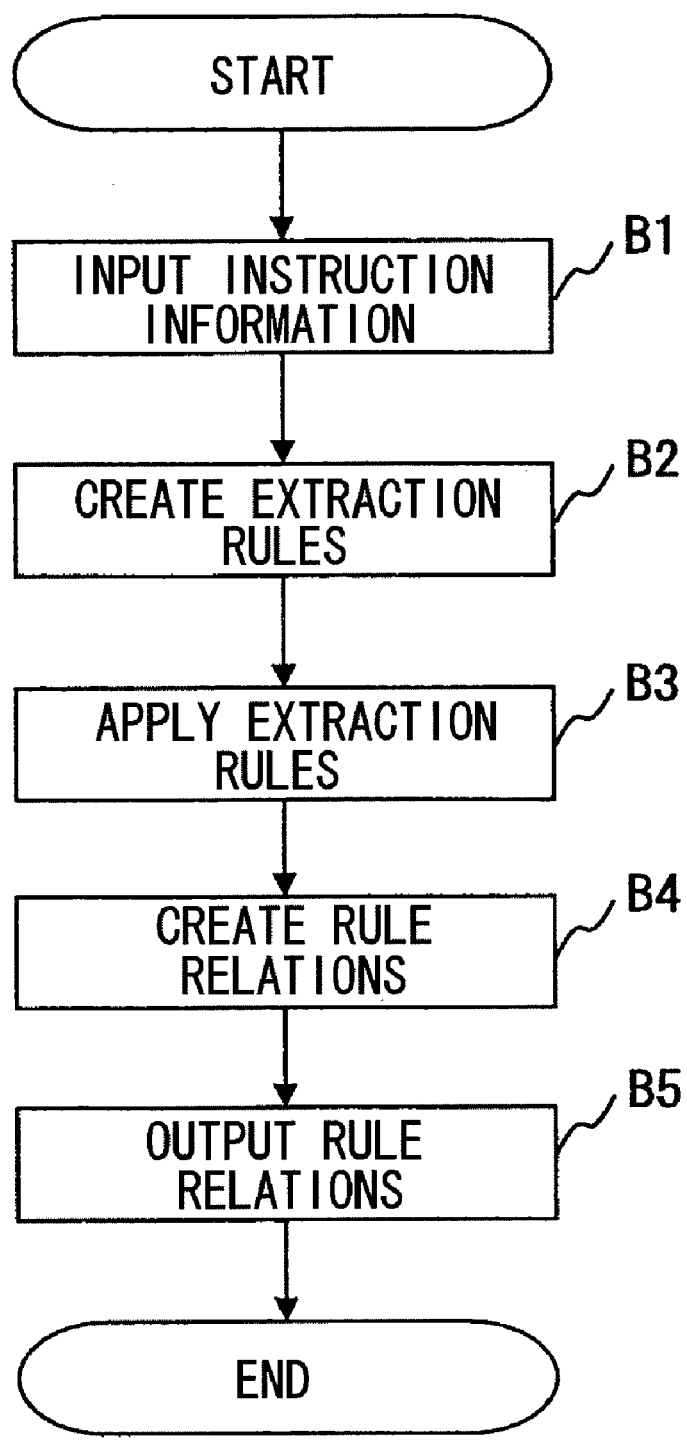
FIG. 4 is a flowchart showing an example of processing supporting the creation of the extraction rules performed by the information extraction rule making support system in the second mode.

Next, the operation will be described. FIG. 4 is a flowchart showing an example of processing supporting the creation of the extraction rules performed by the information extraction rule making support system in the second mode.

In the first mode, the extraction rule input section 10 shown in FIG. 1 receives extraction rules, and the extraction rule applying section 11 receives these inputted extraction rules and applies them to extract information. In the present mode, extraction rules are not inputted, but a plurality of extraction rule candidates are created based on the instruction information inputted from the input unit 3. Then the extraction rule applying section 11 applies the extraction rules created by the extraction rule creating section 14 to the extraction object documents and extracts information from the extraction object document.

In order to create the extraction rules, first, the extraction rule creating section 14 receives the instruction information including the document for creating extraction rules and the information that specifies the extraction place in the document for creating extraction rules from the input unit 3 as an input according to an instructive operation performed by the user (step B1 in FIG. 4).

Next, having received (the input of) the instruction information from the input unit 3, the extraction rule creating section 14 creates a plurality of extraction rules that extract information from the extraction place specified by the instruction information based on the document for creating extraction rules specified by the instruction information and the information specifying the extraction place in this document for creating extraction rules (step B2 in FIG. 4). Then the extraction rule creating section 14 hands (outputs) each of the created extraction rules to the extraction rule applying section 11.

Since each processing performed by the extraction rule applying section 11, the rule relation creating section 12, and the rule relation output section 13 in FIG. 3 in steps B3, B4, and B5 in FIG. 4 is identical to the steps A2, A3, and A4, respectively, in FIG. 2 described in the first mode, the explanations of these steps will be omitted to avoid redundant explanations.

As described, according to the present mode, the information extraction rule making support system comprises the extraction rule creating section 14 that creates a plurality of extraction rule candidates based on the document for creating extraction rules and the information specifying the extraction place in this document for creating extraction rules. Further, the information extraction rule making support system comprises the extraction rule applying section 11 that obtains (derives) extraction results based on the created extraction rules and the extraction object documents stored in the extraction object document storage section 20. Further, the information extraction rule making support system comprises the rule relation creating section 12 that creates the rule relation information and the rule relation output section 13 that outputs the rule relation information. As a result, extraction rule candidates for extracting desired information can be automatically created and the relation information between the created extraction rules can be obtained by having the user input the simple instruction information.

In the present mode, according to the configuration described above, without inputting a large amount of teacher data in advance, or preparing and inputting extraction rules in advance, the relations between extraction rule candidates can be confirmed and the creation of extraction rules can be efficiently supported by simply inputting the information that specifies the desired extraction place.

Mode 3

Figure 5:
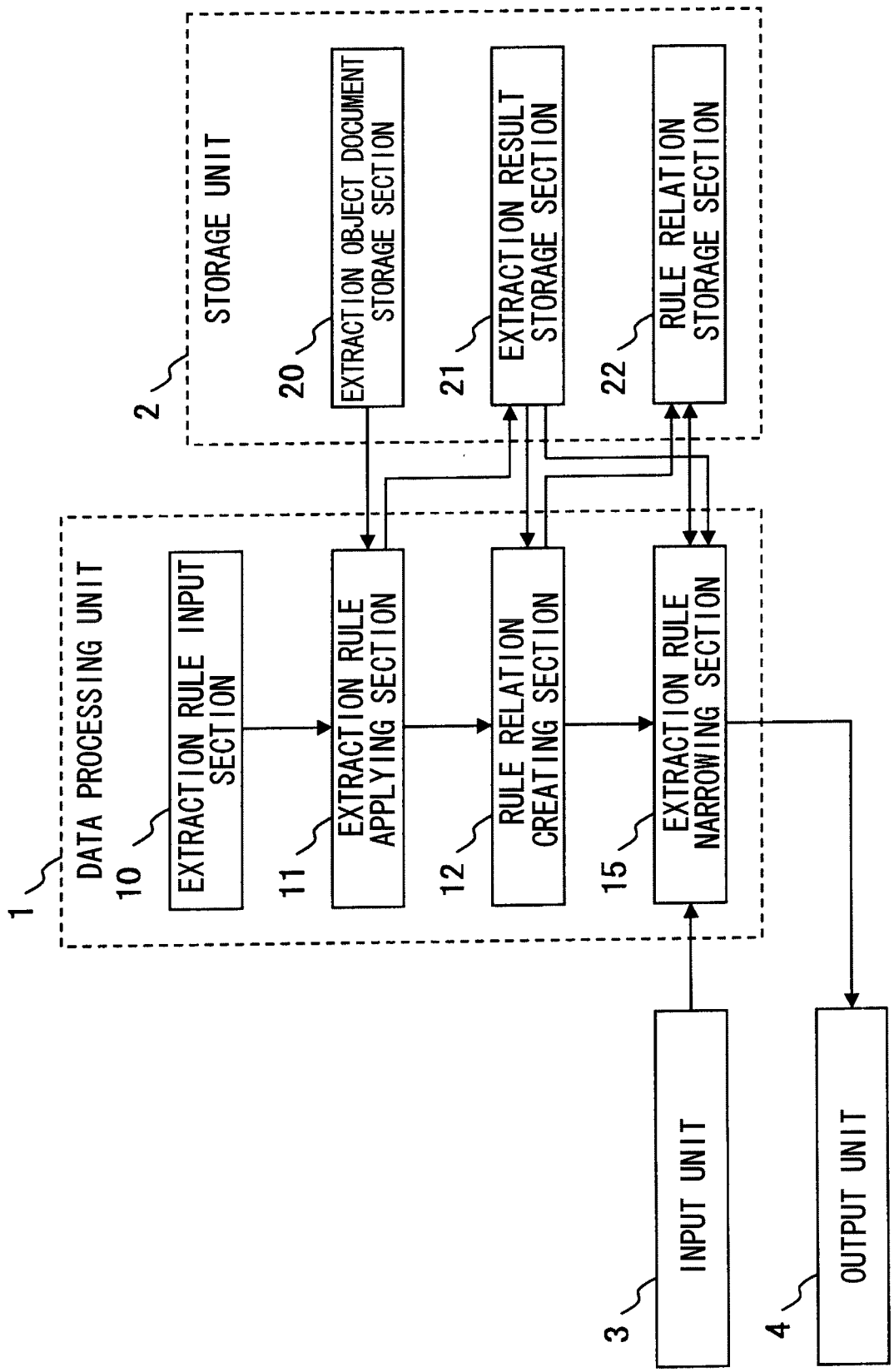
FIG. 5 is a block diagram showing a configuration example of an information extraction rule making support system in a third mode.

Next, a third mode of the present invention will be described with reference to the drawings. FIG. 5 is a block diagram showing a configuration example of an information extraction rule making support system in the third mode. As shown in FIG. 5, the present mode differs from the first mode in that the data processing unit 1 has the extraction rule narrowing section 15 instead of the rule relation output section 13 of the data processing unit 1 shown in FIG. 1. Further, the present mode differs from the first mode in that the information extraction rule making support system has an input unit 3 (for instance a keyboard and mouse) and an output unit 4 (for instance a display device such as a display screen and a printing device such as a printer) in addition to the constituent elements show in FIG. 1.

In the present mode, the extraction rule narrowing section 15 comprises a function of narrowing down the extraction rules using the rule relation information created by the rule relation creating section 12. In the present mode, the extraction rule narrowing section 15 presents (for instance displays) only the extraction results between particular extraction rules to the user based on the rule relation information created by the rule relation creating section 12. Further, the extraction rule narrowing section 15 receives an input of a selection instruction instructing whether or not the presented extraction results are accepted according to an operation performed by the user. Then, according to selection instructions by the user, the extraction rule narrowing section 15 narrows down the extraction rules by distinguishing accepted extraction rules from rejected ones and using only the extraction rules deemed acceptable.

For instance, the extraction rule narrowing section 15 selects a link included in the rule relation network created by the rule relation creating section 12 based on predetermined priority. Further, the extraction rule narrowing section 15 creates presented information at least including extraction results extracted using only an extraction rule, which can obtain most extraction results when information extraction is performed using the extraction rule, out of extraction rules corresponding to the selected link. Further, the extraction rule narrowing section 15 receives an input of judgment information indicating the accuracy of the extraction results included in the presented information, and judges the acceptability of at least one extraction rule based on the inputted judgment information and the rule relation network.

Further, for instance, the extraction rule narrowing section 15 selects an extraction rule based on the proportion of the number of extraction results corresponding to extraction rules linked in the rule relation network created by the rule relation creating section 12. Further, the extraction rule narrowing section 15 selects an extraction rule based on the number of descendant nodes of extraction rules linked in the rule relation network created by the rule relation creating section 12. Further, for instance, the extraction rule narrowing section 15 selects an extraction rule based on the proportion of the number of extraction results corresponding to extraction rules linked in the rule relation network created by the rule relation creating section 12 and a score value calculated using the number of descendant nodes of extraction rules linked in the rule relation network.

Further, the functions of the constituent elements other than the extraction rule narrowing section 15 in the information extraction rule making support system are the same as their functions described in the first mode.

Figure 6:
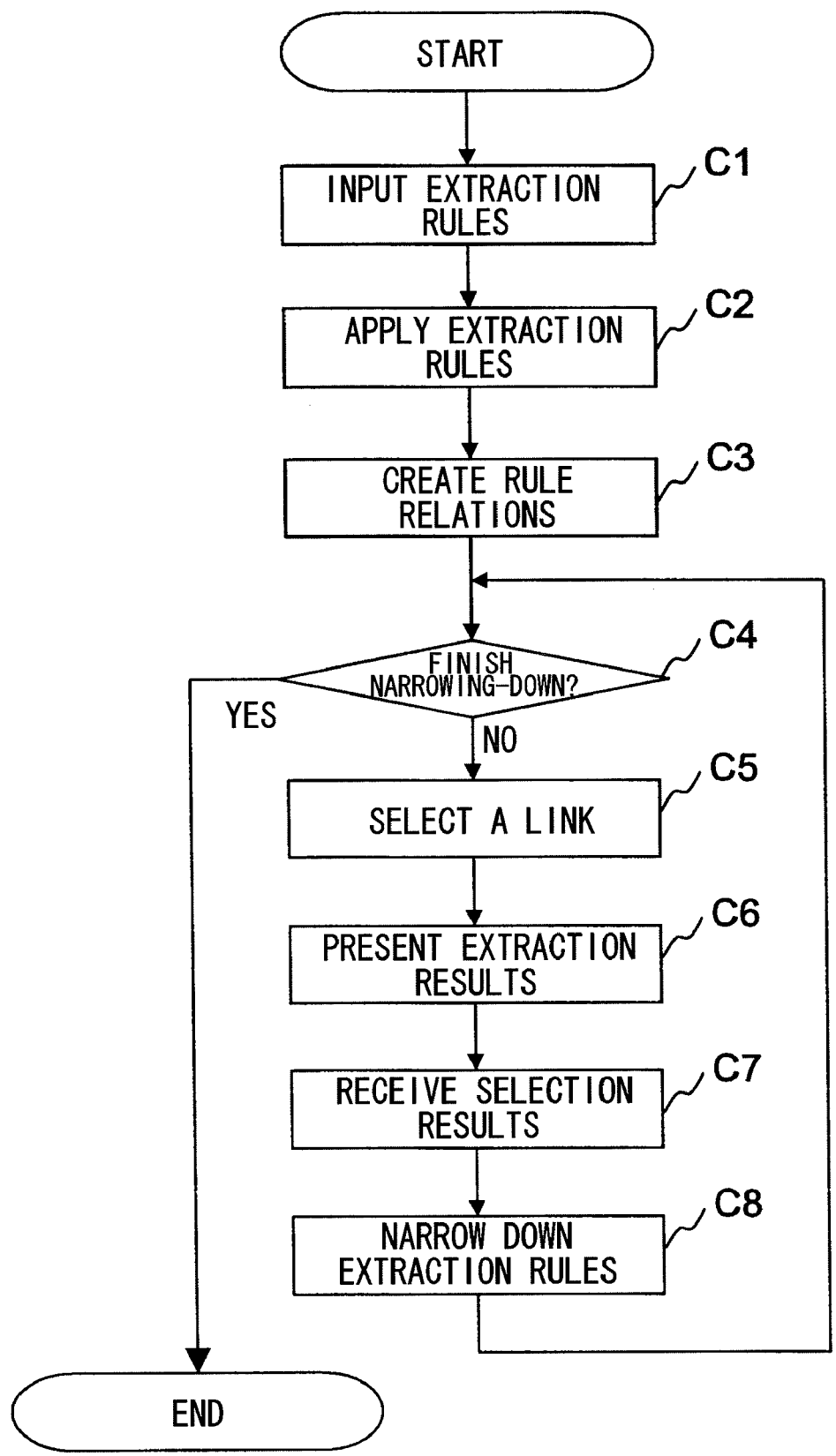
FIG. 6 is a flowchart showing an example of processing supporting the creation of the extraction rules performed by the information extraction rule making support system in the third mode.

Next, the operation will be described. FIG. 6 is a flowchart showing an example of processing supporting the creation of the extraction rules performed by the information extraction rule making support system in the third mode.

Further, since each processing performed by the extraction rule input section 10, the extraction rule applying section 11, and the rule relation creating section 12 in FIG. 5 in steps C1, C2, and C3 in FIG. 6 is identical to the steps A1, A2, and A3, respectively, in FIG. 2 described in the first mode, detailed explanation will not be given.

In the present mode, in the step C3 in FIG. 6, the rule relation creating section 12 of the data processing unit 1 in FIG. 5 creates the rule relation information as in the step A3 in FIG. 2 in the first mode. Then the rule relation creating section 12 hands (outputs) the created rule relation information to the extraction rule narrowing section 15 of the data processing unit 1.

Next, in the processing from step C4 in FIG. 6 on, the extraction rule narrowing section 15 narrows down the extraction rules using the rule relation information received from (inputted by) the rule relation creating section 12.

When narrowing down the extraction rules, the extraction rule narrowing section 15 determines whether or not there is any unchecked link between the extraction rules in the links included in the rule relation information based on the rule relation information (the step C4 in FIG. 6).

When no unchecked link is found in the step C4 (i.e., when the processing from the step C4 to step C8 is performed on all the links included in the rule relation information), the processing of the extraction rule narrowing section 15 ends thereupon.

It should be noted that, when the processing of the step C4 is performed for the first time immediately after the processing of the step C3 is performed, all the links, which are predetermined processing objects, are unchecked. Further, the extraction rule narrowing section 15 may include (for instance, add) information pertaining to the act of checking for each link (information indicating whether or not the link has been checked) in (to) the rule relation information. Further, the extraction rule narrowing section 15 may hold the information pertaining the act of checking for each link separated from the rule relation information. (For instance, it may be stored in a storage device such as a memory).

Further, in terms of the predetermined processing objects, the extraction rule narrowing section 15 may perform the processing on, for instance, all links in including relations. Or using an overlapping ratio derived by dividing the number of pieces of the same information extracted by extraction rules by the information extracted by ancestor (parent) nodes extracting fewer extraction results, the extraction rule narrowing section 15 may perform the processing on all links having an overlapping ratio not less than a predetermined value.

When an unchecked link is found in the step C4 (i.e., when there is any unprocessed link among the links included in the rule relation information), the extraction rule narrowing section 15 selects at least one link from the rule relation information based on a predetermined selection method (the step C5 in FIG. 6). It should be noted that the extraction rule narrowing section 15 does not necessarily have to select only one link, but it may select a plurality of links.

Further, in the step C5, for instance, the extraction rule narrowing section 15 can select unchecked links included in the rule relation information in the ascending order of the number of pieces of extracted information using each extraction rule of the unchecked links and comparing the extraction results to each other. Aside from this selection method, for instance, the extraction rule narrowing section 15 may select unchecked links in the descending order of the number of descendant nodes traceable from a node extracting fewer pieces of extracted information. Further, for instance, the extraction rule narrowing section 15 may select unchecked links in the descending order of the maximum path length from a node extracting fewer pieces of extracted information to descendant nodes. Further, for instance, the extraction rule narrowing section 15 may select unchecked links based on the score calculated using the number of different pieces of information between the extraction rules or the proportion of extracted information and the maximum path length from a node extracting fewer pieces of extracted information to descendant nodes. The selection method is not limited to those described in the present mode.

Next, the extraction rule narrowing section 15 extracts a part of the results extracted using each extraction rule of the selected link based on the rule relation information. Then the extraction rule narrowing section 15 converts the extraction result into an appropriate format in order to present it to the user and outputs the result to the output unit 4 (the step C6 in FIG. 6). The output unit 4 receives (the input of) the extraction result and presents the extraction result according to an instruction of the extraction rule narrowing section 15. For instance, when the output unit 4 is a display device, the extraction rule narrowing section 15 has the output unit 4 display the extraction result. Further, for instance, when the output unit 4 is a printing device, the extraction rule narrowing section 15 has the output unit 4 print the extraction result.

Further, when selecting a plurality of links, the extraction rule narrowing section 15 may extract the extraction results as it does when it processes each link individually. In this case, it is preferable that the extraction rule narrowing section 15 extract the results giving priority to a predetermined number of most significant links in terms of selection criteria.

Further, in the step C6, the extraction rule narrowing section 15 has the output unit 4 output information asking for a selection instruction that indicates whether or not the user wants to accept the presented extraction result, along with the extraction result. For instance, the extraction rule narrowing section 15 has the output unit 4 display or print a message such as "Do you want to accept the result?" along with the extraction result.

Then the user performs an input operation of the selection instruction indicating whether or not he wants to accept the presented extraction result by operating the input unit 3. Then the extraction rule narrowing section 15 receives (the input of) selection information, including the selection instruction indicating whether or not the extraction result presented (outputted) using the output unit 4 is accepted, from the input unit 3 according to the operation performed by the user (the step C7 in FIG. 6).

Next, having received (the input of) the selection information, the extraction rule narrowing section 15 performs processing that narrows down the extraction rules (the step C8 in FIG. 6). When performing the processing that narrows down the extraction rules, the extraction rule narrowing section 15 makes a judgment as to whether or not each extraction rule is accepted on all the extraction rules that can be judged using the selection information based on the received (inputted) selection information. Then the extraction rule narrowing section 15 deems the judged links checked links.

Further, when making the judgment as to whether or not each extraction rule is accepted and judging a certain extraction rule acceptable, the extraction rule narrowing section 15 deems all extraction rules extracting extraction results connoted by the extraction results extracted by this accepted extraction rule acceptable. In this case, the extraction rule narrowing section 15 can simply trace all the nodes in the reverse direction towards ancestral extraction rules extracting fewer results based on the rule relation information. Then the extraction rule narrowing section 15 deems the links traced in the reverse direction checked links.

Further, when rejecting a certain extraction rule, the extraction rule narrowing section 15 rejects all extraction rules including the results extracted by this rejected extraction rule. In this case, the extraction rule narrowing section 15 can simply trace the nodes in the direction towards descendant extraction rules extracting more results based on the rule relation information. Then the extraction rule narrowing section 15 deems each link traced checked links.

When the extraction rule narrowing section 15 finishes the narrowing-down processing in the step C8 in FIG. 6, it returns to the step C4 in FIG. 6. Then the extraction rule narrowing section 15 determines whether or not there is any unchecked link between the extraction rules and continues to perform the narrowing-down processing until there is no more unchecked link or the processing is interrupted (for instance, an interruption by the user).

As described, according to the present mode, the rule relation creating section 12 creates the rule relation information based on a plurality of extraction rule candidates and the extraction results extracted by the extraction rules. Further, after the rule relation information is created, based on the rule relation information, the extraction rule narrowing section 15 selects a link between the extraction rules and presents the extraction result. Then the extraction rule narrowing section 15 judges the acceptability of at least one extraction rule based on the selection information indicating the acceptability of this extraction result and the rule relation information. As a result, extraction rules that extract desired information can be efficiently narrowed down by inputting the extraction rule candidates and the selection information indicating whether or not the presented extraction results are accepted.

In the present mode, according to the configuration described above, without inputting a large amount of teacher data in advance, the extraction rules used to extract desired information can be easily narrowed down and the creation of the extraction rules can be efficiently supported by simply inputting a plurality of the extraction rule candidates and the selection information indicating whether or not the selected extraction results are accepted.

Mode 4

Figure 7:
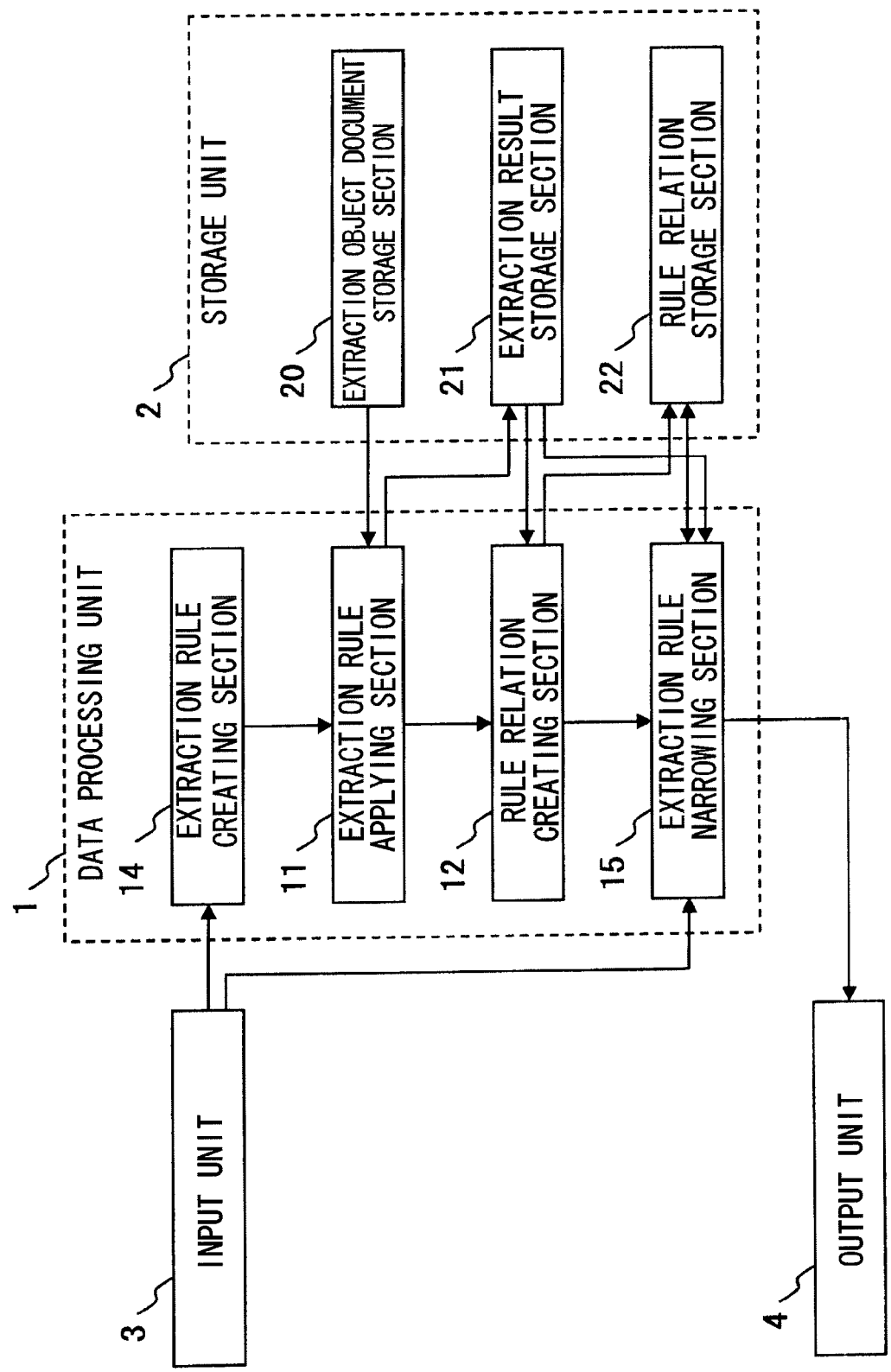
FIG. 7 is a block diagram showing a configuration example of an information extraction rule making support system in a fourth mode.

Next, a fourth mode of the present invention will be described with reference to the drawings. FIG. 7 is a block diagram showing a configuration example of an information extraction rule making support system in the fourth mode. As shown in FIG. 7, the present mode differs from the third mode in that the data processing unit 1 has the extraction rule creating section 14 instead of the extraction rule input section 10 of the data processing unit 1 shown in FIG. 1.

Note that the functions of the extraction rule creating section 14 shown in FIG. 7 in the present mode are the same as those of the extraction rule creating section 14 of the data processing unit 1 in FIG. 3 described in the second mode.

Further, the functions of the constituent elements other than the extraction rule creating section 14 in the information extraction rule making support system are the same as their functions described in the first mode.

Figure 8:
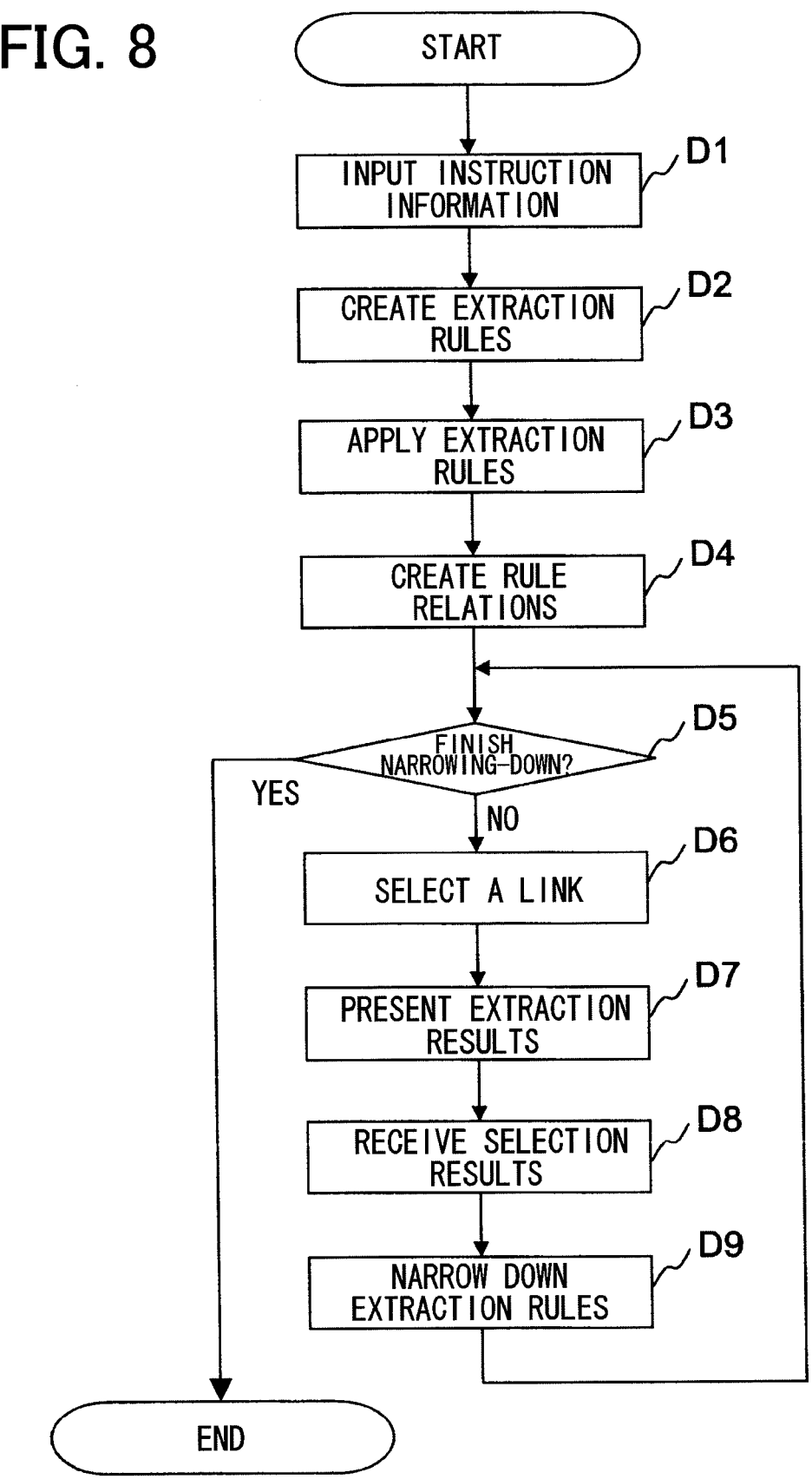
FIG. 8 is a flowchart showing an example of processing supporting the creation of the extraction rules performed by the information extraction rule making support system in the fourth mode.

Next, the operation will be described. FIG. 8 is a flowchart showing an example of processing supporting the creation of the extraction rules performed by the information extraction rule making support system in the fourth mode.

In the present mode, since processing performed in steps D1 and D2 in FIG. 8 using the input unit 3 and the extraction rule creating section 14 is identical to the processing in the steps B1 and B2 in FIG. 4 described in the second mode, a detailed explanation will be omitted. Further, in the present mode, since processing performed in steps D3 to D9 in FIG. 8 using the rule relation creating section 12, the extraction rule narrowing section 15, the input unit 3, and the output unit 4 is identical to the processing in the steps C2 to C8 in FIG. 6 described in the third mode, a detailed explanation will be omitted.

As described, according to the present mode, a plurality of extraction rule candidates are created based on the document for creating extraction rules and the information specifying extraction place in this document for creating extraction rules. Further, the rule relation information is created based on the extraction results obtained by applying the created extraction rules. Further, the acceptability of at least one extraction rule is judged based on the rule relation information and the selection information indicating whether or not the extraction result of the selected link is accepted, and the extraction rules are narrowed down.

In the present mode, according to the configuration described above, the creation of the extraction rules can be automated by inputting simple instruction information, and the extraction rules used to extract desired information can be narrowed down by simply selecting the presented extraction results. As a result, rules used to extract desired information can be efficiently created.

Mode 5

Figure 9:
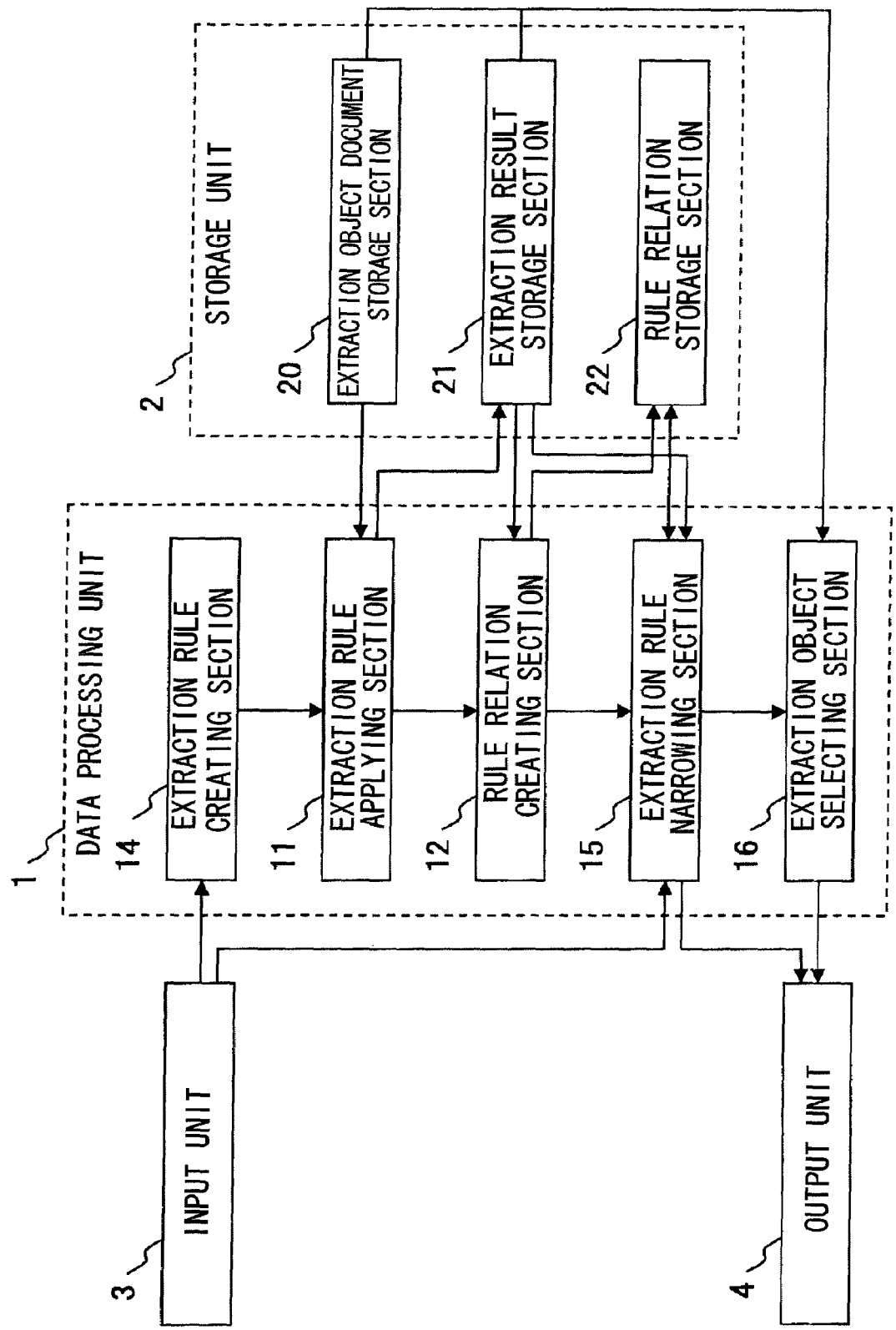
FIG. 9 is a block diagram showing a configuration example of an information extraction rule making support system in a fifth mode.

Next, a fifth mode of the present invention will be described with reference to the drawings. FIG. 9 is a block diagram showing a configuration example of an information extraction rule making support system in the fifth mode. As shown in FIG. 9, the present mode differs from the fourth mode in that the data processing unit 1 has extraction object selecting section 16 in addition to the constituent elements of the data processing unit 1 shown in FIG. 7.

The extraction object selecting section 16 comprises a function of selecting information, different than the information of the extraction place specified in the instruction information received by the extraction rule creating section 14, from the extraction results extracted by the extraction rules narrowed down by the extraction rule narrowing section 15. Further, the extraction object selecting section 16 comprises a function of handing (outputting) the selected information and information pertaining to an extraction object document that includes the selected information (for instance, information from which the extraction object document can be specified) to the output unit 4 or the extraction rule creating section 14 as extraction object information.

Further, the functions of the constituent elements other than the extraction object selecting section 16 in the information extraction rule making support system are the same as their functions described in the fourth mode.

Figure 10:
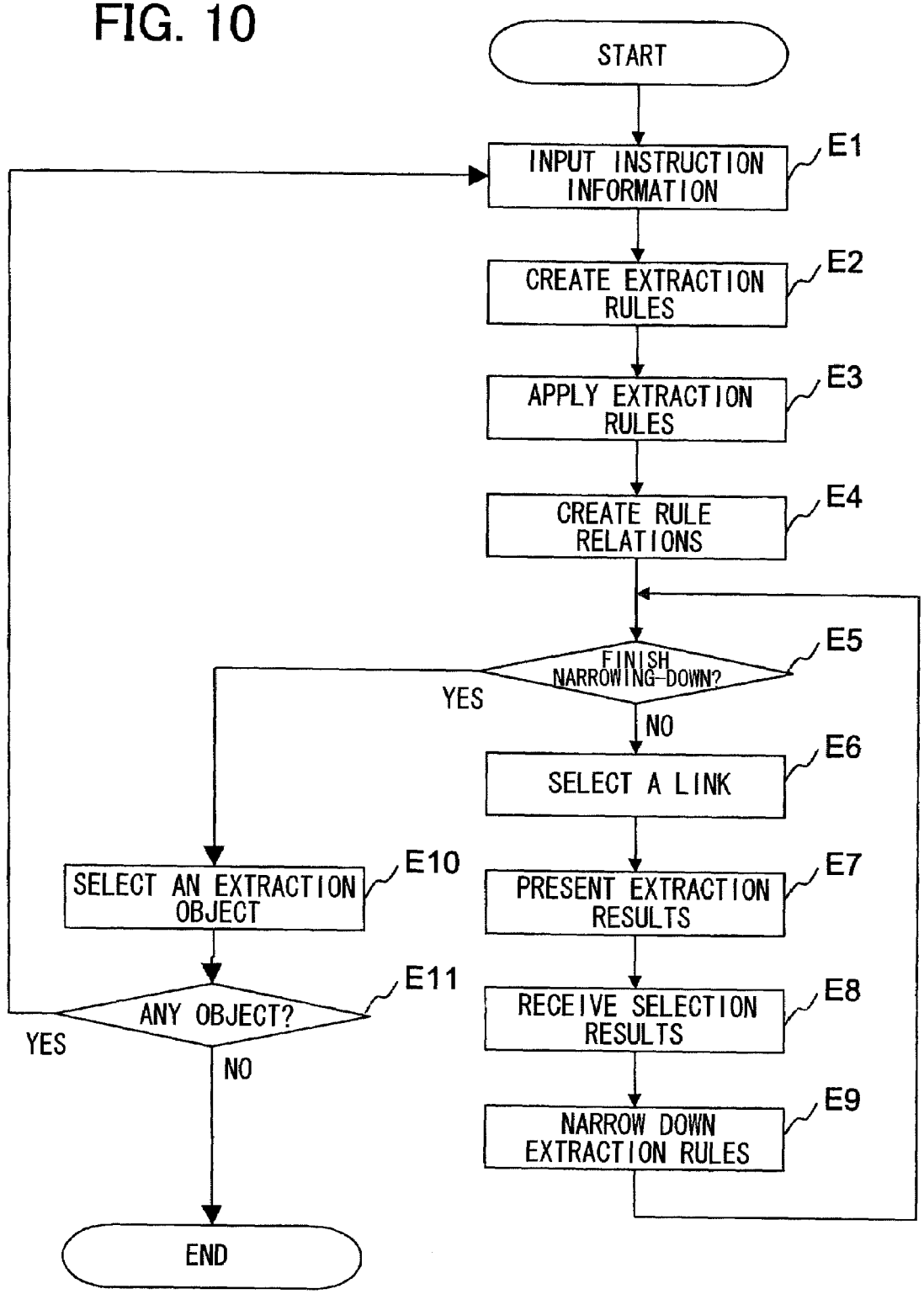
FIG. 10 is a flowchart showing an example of processing supporting the creation of the extraction rules performed by the information extraction rule making support system in the fifth mode.

Next, the operation will be described. FIG. 10 is a flowchart showing an example of processing supporting the creation of the extraction rules performed by the information extraction rule making support system in the fifth mode.

In the present mode, since processing performed in steps E1 to E9 shown in FIG. 10 using the input unit 3, the extraction rule creating section 14, the extraction rule applying section 11, the rule relation creating section 12, the extraction rule narrowing section 15, and the output unit 4 is identical to the processing in the steps D1 to D9 shown in FIG. 8 described in the fourth mode, a detailed explanation will be omitted.

In the fourth mode, when it is determined that the narrowing-down processing is complete based on the rule relation information in the step D5 in FIG. 8, the information extraction rule making support system ends its processing thereupon. In the present mode, in the step E5 in FIG. 10, when it is determined that the narrowing-down processing is complete according to the same processing as the one in the step D5 in FIG. 8, the extraction object selecting section 16 performs processing that selects an extraction object in step E10 in FIG. 10 thereafter.

In other words, in the present mode, the extraction rule narrowing 15 in FIG. 9 operates identically to the extraction rule narrowing section 15 in FIG. 7 in the fourth mode, however, when it determines whether or not there is any unchecked link between the extraction rules in the step E5 in FIG. 10 and if there is no unchecked link, the extraction rule narrowing section 15 hands (outputs) the rule relation information to the extraction object selecting section 16 in FIG. 9.

Next, the extraction object selecting section 16 selects information, different than the information of the extraction place specified in the instruction information based on the rule relation information received by (inputted to) the extraction rule creating section 14, from the results extracted by the extraction rules narrowed down by the extraction rule narrowing section 15 (the step E10 in FIG. 10). Then the extraction object selecting section 16 deems the selected information and the information pertaining to an extraction object document that includes the selected information (for instance, information from which the extraction object document can be specified) the extraction object information.

Further, the extraction rule creating section 14 may hand (output) the received (inputted) instruction information to each of the means 11, 12, 15, and 16 in the step E2 in FIG. 10 or have another storing means such as the storage unit 2 store the information.

When the extraction object selecting section 16 selects information based on the extraction results, what the extraction object selecting section 16 needs to do is to select different information than the information of the extraction place specified in the instruction information. For instance, the selection can be made by detecting information having a different character sequence or morpheme sequence, or information having different information pertaining to the position in the extraction object document. It should be noted that, although an example of the information selection method is described in the present mode, the method in which the extraction object selecting section 16 selects the information is not limited to the method presented in the present mode.

Further, when a plurality of pieces of information are selected, the extraction object selecting section 16 can sort these pieces of information by, for instance, calculating the frequency that the same character sequence as that of the selected information occurs in the extraction object document, the frequency that the same morpheme sequence as that of the selected information occurs in the extraction object document, and a probability of a peripheral morpheme having the same morpheme sequence as that of the extracted information occurring in the extraction object document. In this case, the extraction object selecting section 16 may add the calculated results to the selected information and include them in the extraction object information.

Next, following the step E10 in FIG. 10, the extraction object selecting section 16 determines whether or not there is still any extraction object information left (step E11 in FIG. 10). When there is no extraction object information, the information extraction rule making support system ends its processing thereupon. Further, when there is still the extraction object information left, the extraction object selecting section 16 hands (outputs) the extraction object information to the output unit 4. The output unit 4 presents (for instance, displays) the extraction object information according to an instruction given by the extraction object selecting section 16.

Then, based on the extraction object information, the user operates the input unit 3 and instructs input of the instruction information including the document for creating extraction rules and the information specifying the extraction place in the document for creating extraction rules. The extraction rule creating section 14 receives the input of the instruction information including the document for creating extraction rules and the information specifying the extraction place in the document for creating extraction rules from the input unit 3 according to the operation performed by the user. In this case, the user is able to input new instruction information based on the extraction object information presented (for instance, displayed) using the output unit 4.

For instance, if the document for creating extraction rules and the extraction object information presented (for instance, displayed) using the output unit 4 are presented as a new extraction place and new document for creating extraction rules based on the selected information and the extraction object document including the selected information, they can be applied as an input as they are. When a plurality of pieces of information are selected, the extraction object selecting section 16 may display a plurality of pieces of the information so that the user is able to select the extraction object information as the new instruction information.

In the present mode, according to the configuration described above, the creation of the extraction rules can be automated only by initially inputting simple instruction information, the extraction rules used to extract desired information can be narrowed down by simply selecting the presented extraction results, and the input of new instruction information is facilitated. As a result, rules that extract desired information can be efficiently created.

Example 1

Next, a first example of the present invention will be described with reference to the drawings. Note that an information extraction rule making support system according to the first example corresponds to the information extraction rule making support system described in the first mode of the present invention.

In the present example, the information extraction rule making support system comprises a computer (for instance, personal computer) as the data processing unit 1 and a magnetic disk storage device as the storage unit 2.

Further, the computer has a central processing unit that functions as the extraction rule input section 10, the extraction rule applying section 11, the rule relation creating section 12, and the rule relation output section 13. Further, the computer has a RAM (Random Access Memory) that temporarily stores signals and data relating to each processing.

Further, the storage unit 2 may be storage means other than the magnetic disk storage device. For instance, a memory such as a flash memory device may be used or the RAM in the computer may be used.

In the present example, syntactic analysis results are used as the extraction object document. Syntactic analysis results can be obtained by analyzing a text using a known syntactic analysis technology. Further, as the extraction object document, for instance, morpheme analysis results may be used. Further, a text document may be used as the extraction object document. In these cases, the extraction rule applying section 11 may perform necessary analysis processing before performing information extraction and use the analysis results for the extraction processing.

Figure 11:
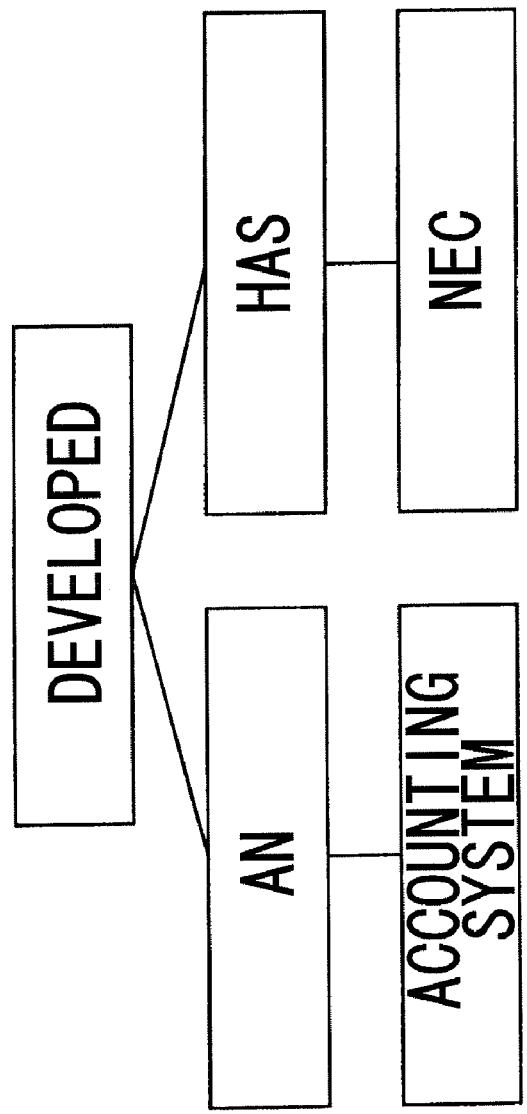
FIG. 11 is an explanation diagram showing an example of a concrete syntax tree in syntactic analysis results.

FIG. 11 is an explanation diagram showing an example of a concrete syntax tree in syntactic analysis results. The example shown in FIG. 11 shows a concrete syntax tree in the syntactic analysis results obtained by performing syntactic analysis on an original sentence "NEC has developed an accounting system." Further, in FIG. 11, morpheme is used as a unit in the concrete syntax tree and represented by each node. In this case, for instance, as shown in FIG. 12, each morpheme is given an attribute and an attribute value.

Further, only some of the morphemes are shown and the others are omitted in the example in FIG. 12, however, the other morphemes not shown in the drawing may be treated similarly to those shown in the drawing. Also, only one example of attribute is shown, however, the attributes given to the morphemes are not limited to the one presented in the present example and other attributes may be used.

The syntactic analysis results containing the above information are treated as the extraction object document and stored in the magnetic disk storage device in advance.

FIG. 13 is an explanation diagram showing an example of the extraction object document stored in the magnetic disk storage device. In the example shown in FIG. 13, the result of analysis performed on each sentence is made into a file as a document and stored in the magnetic disk storage device. Further, an extraction object document ID is given to each file as an identifier, and each extraction object document is associated with the extraction object document ID along with the storage position and stored.

It should be noted that the storage method in which the magnetic disk storage device stores the extraction object document is not limited to the storage method described in the present example. The analysis results may be associated with the extraction object IDs and stored as they are, or they may be stored using other storage formats.

The central processing unit functions as the extraction rule input section 10 and receives a plurality of candidates for the extraction rules that extract information desired by the user. The central processing unit temporarily holds the received (inputted) extraction rules in the RAM. Further, the central processing unit may have the magnetic disk storage device store the inputted extraction rules.

Further, in the present example, an extraction rule ID is given to each extraction rule. FIG. 14 is an explanation diagram showing an example of a format of the extraction rule. As shown in FIG. 14, an extraction rule in the present example includes pattern conditions of extraction including the substructure of the concrete syntax tree, and a condition for outputting extracted parts in a second row or later. Further, the extraction rule may include the extraction rule ID at the head of the first row as shown in the first row in order to facilitate identification. Or if the extraction rule ID is not included in the extraction rule, the extraction rule input section 10 may give the extraction rule ID and have it associated with the extraction rule after receiving (an input of) the extraction rule, as in a format shown in FIG. 15.

Here, in the example shown in FIG. 14, when A is a parent node, and B and C are child nodes, the relationship between the nodes are denoted by A{B, C}, and a morpheme Z is denoted by [Z]. Further, in the example shown in FIG. 14, pertaining to the morpheme Z, the attribute and the attribute value of the morpheme Z are denoted by Attribute Name="Attribute Value." Further, when a plurality of nodes and a plurality of attributes are specified, commas (",") are used to indicate separations. Further, the attribute values are treated as variables and "*" denotes any value.

The example in FIG. 14 shows a rule that extracts a morpheme having an attribute value of "ON" in an "Extraction" attribute, which is the condition for outputting the extracted parts, when a condition that the substructure of a concrete syntax tree in syntactic analysis results, and the attribute and the attribute value of the morpheme coincide is satisfied. When such an extraction rule is used, there are number of combinations of syntax tree structures, nodes, attributes and attribute values, and extracted parts, therefore it is possible to extract various information, depending on the text contents. The example in FIG. 14 shows an extraction rule that extracts information including things developed by NEC.

In the present example, extraction rules that have not been confirmed to be used to extract information desired by the user and extraction rule candidates that might be used to extract desired information are prepared in advance and inputted.

An example of the extraction rule is described in the present example, however, the format of the extraction rule may be ones other than the format presented in the present example and is not limited to it. For instance, an extraction rule in a format other than the one described in the present example may have a phrase in the node instead of a morpheme, and in this case the extraction rule is newly defined with a symbol and description format that distinguish a phrase from a morpheme and a unique attribute. Further, the present example may be realized by using morpheme analysis results as the extraction object document and writing the extraction rule in a regular expression.

Next, the central processing unit functions as the extraction rule applying section 11, performing information extraction by applying the extraction rule to the extraction object document, and has the magnetic disk storage device store the extraction results of each extraction rule.

FIG. 16 is an explanation diagram showing an example of extraction results of the information extraction using the extraction rules. In the example shown in FIG. 16, pieces of the extracted information are individually distinguished using the extraction object document ID and the start and end positions of character sequences in the extraction object document indicated by the extraction object document ID, and stored with extraction contents. Further, the extracted information is stored being associated with the extraction rule ID of the extraction rule that extracted the information. Further, extraction result IDs are given in the example shown in FIG. 16.

In the present example, the results extracted by each particular extraction rule ID can be obtained by referring to the extraction rule ID of the extraction results. Further, in order to speed up processing, the extraction results may be managed (stored) while each extraction rule ID is associated with extraction result IDs as shown in FIG. 17.

Next, the central processing unit functions as the rule relation creating section 12, comparing the extraction results between the extraction rules based on the extraction results and analyzing overlapping relations between the extraction results. Overlapping relations can be detected by comparing the extraction result IDs of each extraction rule between the extraction rules and determining whether or not they coincide. Further, the extraction results may be distinguished and overlapping relations may be detected using the extraction object document IDs and the start and end positions in the document associated with each extraction object document ID.

When there is any overlapping relation, the rule relation creating section 12 creates the rule relation network that links the extraction rules satisfying a predetermined condition and creates the rule relation information including information on associations between the data of the rule relation network and the extraction results.

For instance, in relationships between extraction rules having overlapping relations between their extraction results, let's consider a case where the extraction results of an extraction rule X extracting fewer pieces of extracted information are included in the extraction results of an extraction rule Y extracting more pieces of extraction information. For instance, as a method for creating the rule relation network in this case, the central processing unit creates the rule relation network as a directed graph by creating a directed link from a node X to a node Y with the extraction rule X as the ancestor node X and the extraction rule Y as the descendant node Y.

Further, in relationships between rules having overlapping relations between their extraction results, let's consider another case where the overlapping ratio of the extraction rule X extracting fewer pieces of extracted information is equal to or greater than a predetermined value. For instance, as another method for creating the rule relation network in this case, the central processing unit creates the rule relation network by creating a directed link from the node X to the node Y with the extraction rule X as the ancestor node X and the extraction rule Y as the descendant node Y. The central processing unit can derive the overlapping ratio C of the extraction rule X using the following equation (1).

$$C(X)=S(X,Y)/E(X) \quad \text{Equation (1)}$$

Here, S(X, Y) denotes the number of pieces of information having the same extraction results between the results extracted by the extraction rule X and the extraction rule Y. Further, E(X) denotes the number of the extraction results extracted by the extraction rule X (the information extracted using the extraction rule X).

Further, when the rule relation network is created and if it is possible to link a node X and a node Y by routing through other nodes, the number of links may be reduced by not creating the link between the node X and the node Y.

Further, when the rule relation network between the extraction rules having overlapping or including relations is created, methods other than the methods described in the present example may be used to create the network, and the creation method is not limited to the methods described in the present example.

Here, an example of a method for creating the rule relation network in a case where there is any including relation between the extraction rules having extraction rule IDs of 1, 2, 3, and 4 shown in FIG. 17 will be described. In this case, for instance, the central processing unit compares the extraction result of each extraction rule between all the extraction rules and creates a link from an extraction rule extracting fewer results to an extraction rule extracting more results when there is any including relation.

First, the central processing unit sets up a root node in order to create a linked network.

Next, the central processing unit compares the extraction results of the extraction rules having the extraction rule IDs of 1, 2, 3, and 4 shown in FIG. 17 and obtains (derives) relations such as ones shown in FIG. 18 as links when there is any including relation between the extraction rules. FIG. 18 is an explanation diagram showing data of the rule relation network indicating the information of the links when the extraction rules having including relations are linked.

In FIG. 18, each link shows the extraction rule ID of the included extraction rule X (the extraction rule extracting fewer pieces of information) and the including extraction rule Y (the extraction rule extracting more extraction results), and the central processing unit creates the rule relation network with a set of these links. Further, each link is associated with respective extraction result IDs: a common extraction result ID indicating the overlapping information between the extraction rule X and the extraction rule Y, and a differential extraction result ID indicating differential extraction results between the extraction rule X and the extraction rule Y. Further, each link is given a link ID for the sake of identification.

In the present example, for instance, the central processing unit creates the extraction result of each extraction rule shown in FIGS. 16 and 17 and the data of the rule relation network associated with the extraction results shown in FIG. 18 as the rule relation information.

Figure 19:
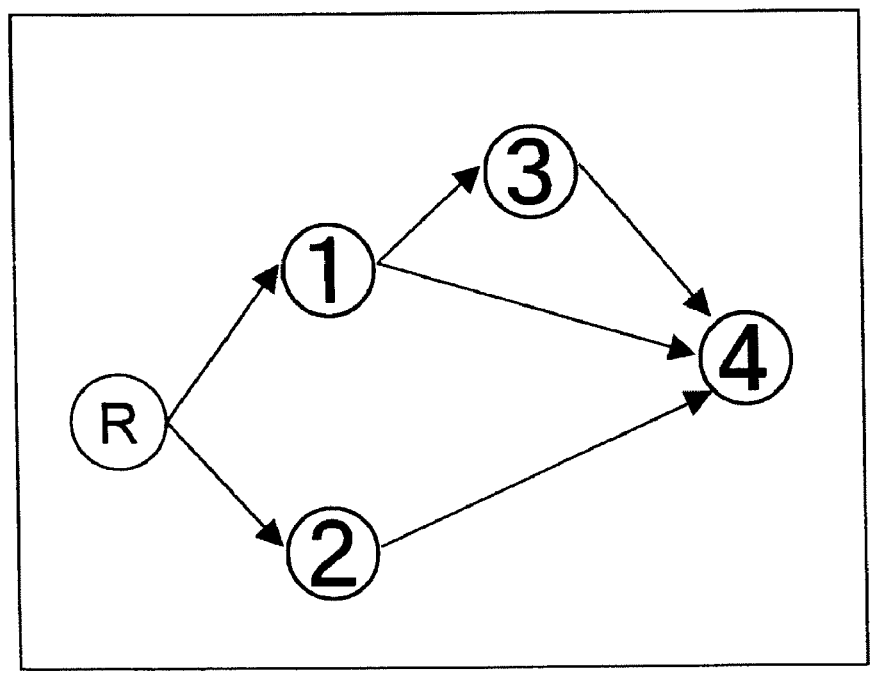
FIG. 19 is an explanation diagram showing an example of rule relation information presented in graph format.

Further, the rule relation information described in the present example is merely an example. The rule relation information may be presented in a format different than the format described in the present example, and it is not limited to the format presented in the present example. For instance, as shown in FIG. 19, the rule relation information may be presented as a graph showing the relationships between the links. FIG. 19 is an explanation diagram showing the rule relation information presented in graph format in which the links connecting the extraction rule IDs as nodes are connected using lines.

Further, upon the creation of a link, if it is possible to link the node of extraction rule X and the node of the extraction rule Y, which this link is supposed to connect, by taking other paths, the scale of the network can be reduced by not creating this particular link. Further, after a link has been created, tracing each ancestor node from the extraction rule Y node of this link, if it is possible to connect each ancestor node to its descendant nodes via other paths, the links directly connecting these nodes can be deleted. For instance, in the network shown in FIG. 18, since the path between the nodes X and Y connected by the link with link ID 3 can be traced by going through the links with link IDs 2 and 4, the link with the link ID 3 may be deleted. In this case, as in FIG. 19, the rule relation information may be made into a graph as shown in FIG. 20.

Figure 20:
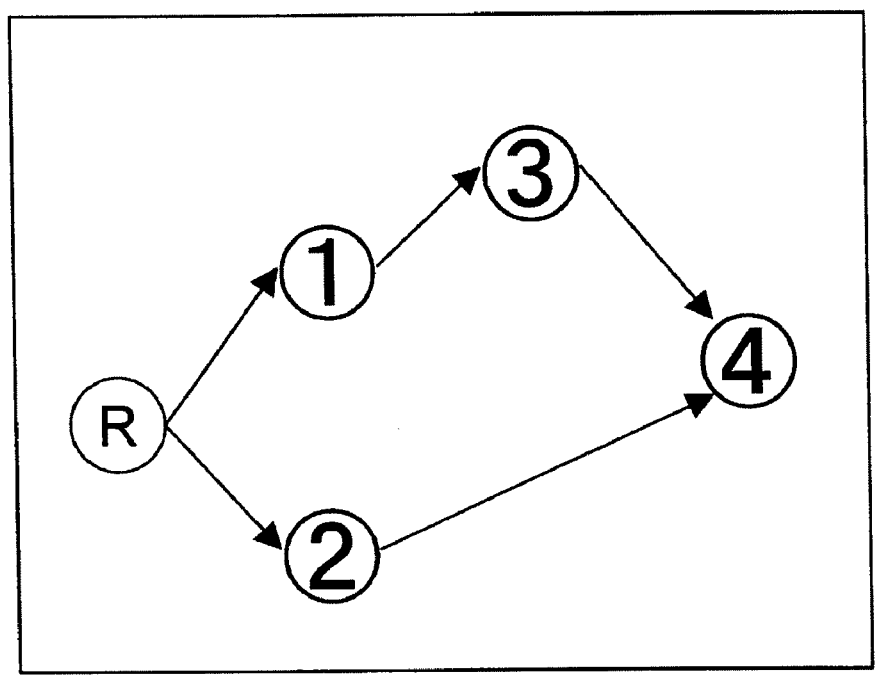
FIG. 20 is an explanation diagram showing another example of the rule relation information presented in graph format.
Figure 21:
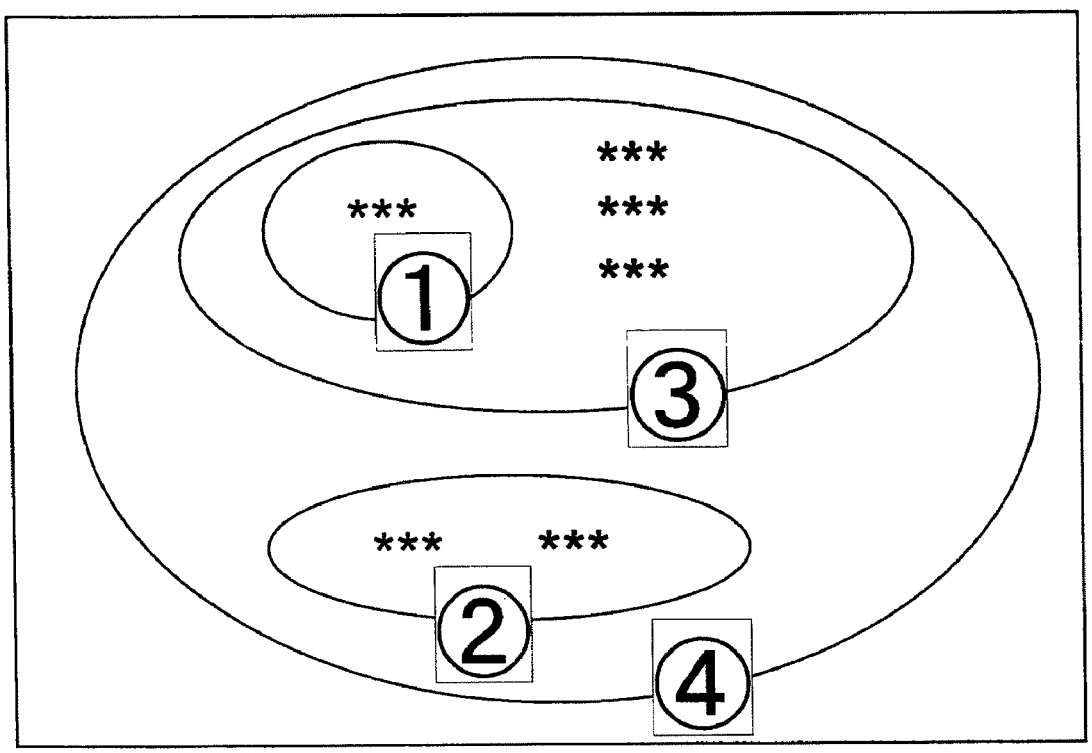
FIG. 21 is an explanation diagram showing an example of the rule relation information presented as a Venn diagram.

Further, as shown in FIG. 21, instead of the graphs representing the rule relation information shown in FIGS. 19 and 20, the including relations may be expressed as a Venn diagram showing sets of the extraction results. In this case, the contents of the extraction results may be displayed in the rule relation information diagram. The amount of the extraction results displayed in the rule relation information diagram may be reduced by displaying only the differential extraction results.

Finally, the central processing unit functions as the rule relation output section 13, outputting the rule relation information.

Example 2

Next, a second example of the present invention will be described with reference to the drawings. Note that an information extraction rule making support system according to the second example corresponds to the information extraction rule making support system described in the second mode of the present invention.

In the second example, the information extraction rule making support system comprises a keyboard and mouse as the input unit 3 and a display device as the output unit 4 in addition to the constituent elements described in the first example. Further, the second example differs from the first example in that the central processing unit of the computer also functions as the extraction rule creating section 14 instead of the extraction rule input section 10.

Now it is assumed that, from the keyboard, the central processing unit has inputted the file name of the document for creating extraction rules that includes the original text and the start and end positions of a character sequence in a place where extraction is desired to be performed in this document for creating extraction rules as the instruction information. For instance, it is assumed that the central processing unit has inputted instruction information specifying a place where "accounting system" of the original text shown in FIG. 11 is extracted. Further, the central processing unit may input instruction information specifying, for instance, a particular order of sequence in a morpheme sequence. As long as it is information specifying positions in the document for creating extraction rules, the instruction information is not limited to the format described in the present example. Further, it may be configured so that the document for creating extraction rules is displayed on the display device as a text and the user can select and specify an extraction place from the text by operating the keyboard and the mouse.

The central processing unit functions as the extraction rule creating section 14, creating a plurality of extraction rules that can extract the extraction place specified in the instruction information. Following the same format described in the first example and showing the extraction rules in the format in FIG. 14, the central processing unit can create numerous extraction rules. For instance, the central processing unit can create the plurality of extraction rules by specifying an "extraction" attribute for at least one morpheme corresponding to the extraction place specified by the instruction information and developing patterns by combining the attributes of the morpheme and morphemes surrounding it or any attribute of each morpheme. Further, the central processing unit may create the extraction rules, including substructures of a concrete syntax tree that includes the extraction place in the patterns, as shown in FIG. 14.

Further, in order to reduce the number of the extraction rules, the central processing unit may create the extraction rules while setting a predetermined upper limit number by limiting the number of layers in the structure, the number of the attributes, or the number of the extraction rules. Or the central processing unit may create the extraction rules while setting a limit by making sure that predetermined unnecessary attributes will not be added to the extraction rules. Note that the method for setting limits is not limited to the ones described in the present example, and the extraction rules may be created using other limitation methods.

Next, the central processing unit functions as the extraction rule applying section 11, the rule relation creating section 12, and the rule relation output section 13 as in the first example.

Then the central processing unit creates the rule relation information according to the same processing as the one described in the first example.

Finally, the central processing unit presents (displays) the rule relation information using the output destination of the rule relation output section 13 as a display device. In this case, as in the first example, the central processing unit may output the rule relation information as a graph such as the ones shown in FIGS. 19 and 20. Further, the rule relation information may be outputted as a Venn diagram as the one shown in FIG. 21. In this case, the central processing unit may simultaneously display the extraction results in the diagram based on particular elements in each diagram such as nodes, links and sets, and the rule relation information. Further, the central processing unit may present (display) the extraction results corresponding to an element such as a node, link, and set in each diagram when a particular element is selected by the input unit 3 such as the keyboard or mouse.

Example 3

Next, a third example of the present invention will be described with reference to the drawings. Note that an information extraction rule making support system according to the third example corresponds to the information extraction rule making support system described in the third mode of the present invention.

In the third example, the information extraction rule making support system comprises a keyboard and mouse as the input unit 3 and a display device as the output unit 4 in addition to the constituent elements described in the first example. Further, the third example differs from the first example in that the central processing unit of the computer also functions as the extraction rule narrowing section 15.

The rule relation information is outputted as it is in the first example, however, the extraction rules are narrowed down based on the rule relation information in the third example.

As in the first example, in the third example, the central processing unit functions as the extraction rule input section 10 and the extraction rule applying section 11, performing information extraction based on extraction rules received as an input and obtaining (deriving) extraction results. In this case, the central processing unit derives extraction results, having the information on acceptability accompany the results as the result extracted by each extraction rule in addition to each element in the extraction results in FIG. 17 described in the first example.

Next, the central processing unit functions as the rule relation creating section 12, creating the rule relation information based on the extraction results. Further, the central processing unit may have the storage unit store the created rule relation information.

Here, in the third example, the central processing unit creates data, as the rule relation information, in which a selection score and a flag indicating that the link has been checked are given to each link as shown in FIG. 23 in addition to the data of the rule relation network shown in FIG. 18. FIG. 23 is an explanation diagram showing an example of the rule relation information including the selection score calculated as the ratio of the number of pieces of information extracted by the extraction rules of each link. Note that the central processing unit may derive the selection score using other methods than the calculation method described in the present example, and the method for calculating the selection score is not limited to the one described in the present example.

Further, in the present example, the data shown in FIG. 18 and the one shown in FIG. 23 are presented as different examples, however, the central processing unit may derive the rule relation information, treating the data shown in FIGS. 18 and 23 as one piece of data.

Having created the rule relation information, the central processing unit functions as the extraction rule narrowing section 15. First, the central processing unit performs the narrowing-down processing if there is any unchecked link without the flag indicating that the link has been checked (link having "0" in the flag column in FIG. 23) based on the data shown in FIG. 23. When there is no unchecked link, the central processing unit ends its processing.

If there is any unchecked link, the central processing unit selects the links in the descending order of the selection score. In the example shown in FIG. 22, the central processing unit selects the link with the link ID 2 having the highest selection score among the unchecked links.

Next, the central processing unit converts a part of the extraction results from the selected link into a format appropriate for the presentation to the user based on the rule relation information. Then the central processing unit presents (displays) the rule relation information in the converted format using the display device, which is the output unit 4. For instance, when selecting the link with the link ID 2, the central processing unit is able to present the extraction results of the extraction rules with the extraction rule IDs 1 and 3.

The present example will further describe an example in which only differential extraction results are presented. For instance, when selecting the link with the link ID 2, since the differential extraction result IDs of the link are 3, 5, and 6, the central processing unit can present the corresponding extraction contents of the extraction results IDs from the data of the extraction results shown in FIG. 18. According to such an example, when there are numerous pieces of the extracted information, the information presented to the user can be reduced and so can the amount of the information that the user needs to confirm.

Figure 24:
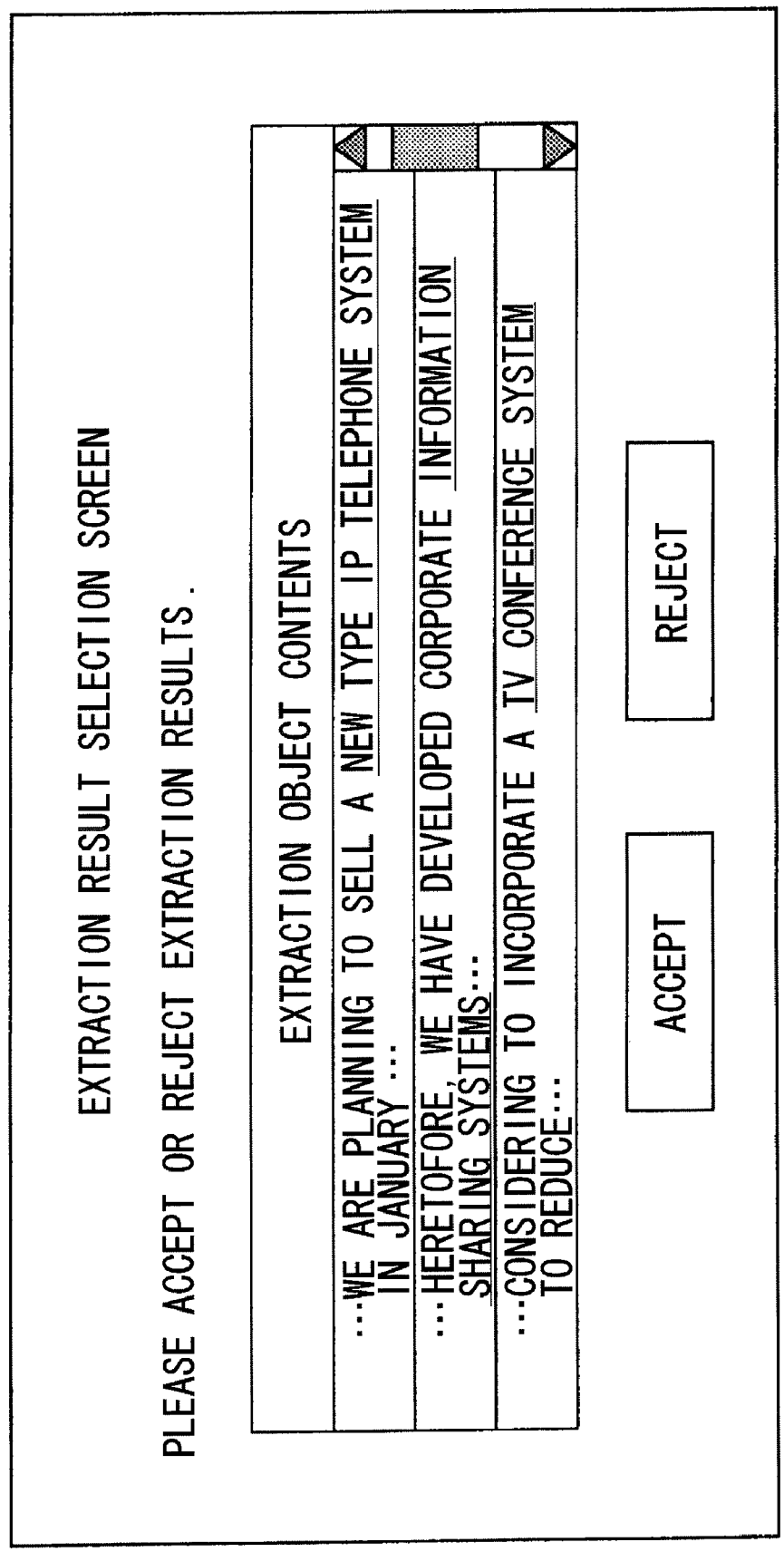
FIG. 24 is an explanation diagram showing an example of a screen that presents the extraction results.

As an example of a format in which the extraction results are presented to the user, for instance, the results can be outputted (displayed) using a screen presenting the extraction results shown in FIG. 24. The presentation screen of the extraction results shown in FIG. 24 points out and underlines the extracted place in each piece of the extracted information, and further presents (displays) parts of the sentence including before and after the extracted place. Note that only the extracted place may be presented (displayed). Further, in the example shown in FIG. 24, buttons that receive the selection instruction indicating whether the presented extraction result is accepted or rejected are presented (displayed), therefore the screen also functions as a selection screen for the extraction results. The selection instruction indicating whether or not the presented extraction result is accepted may be received by, for instance, a check box individually provide for each piece of the extracted information.

Next, based on the presented information, the user gives the selection instruction indicating whether or not the presented result is accepted, by operating the input unit 3 such as the keyboard. Then the central processing unit receives the input of the selection result from the input unit 3. In the example shown in FIG. 24, the central processing unit is able to receive (an input of) information indicating whether or not the extraction result is accepted as the selection information.

Having received (the input of) the selection information, the central processing unit judges the extraction rules of the link that can be judged based on the selection information, and deems that this link has been judged. Now, in the example shown in FIG. 23, it is assumed that the presented information is the differential extraction results between the extraction rules of the link with the link ID 2 and the central processing unit has received (an input of) information indicating that the presented result is rejected. Then the central processing unit can judge that the extraction rule with the extraction rule ID 3 on the descendant node side (the extraction rule Y) is rejected. Further, the central processing unit can record the judgment result as the information pertaining the acceptability of the extraction rule for each extraction rule ID shown in FIG. 22.

Note that the judgment pertaining the acceptability of the extraction rules may be made according to the presented extraction results using methods other than the one described in the present example, and the method is not limited to the one described in the present example. For instance, in the case where a check mark indicating whether or not an extraction result is accepted is given to each extraction result, the central processing unit can accept corresponding extraction rules when all the inputted checking results indicate "accepted" or reject corresponding extraction rules when there is at least one checking result indicating "rejected." Further, when perfection is not important and some errors can be allowed, it is possible to have the central processing unit accept the extraction rules when the inputted checking results show at least a predetermined acceptance ratio.

Further, when rejecting the extraction rule with the extraction rule ID 3, the central processing unit can simultaneously reject its descendant nodes. For instance, with reference to the link ID 4, the extraction rule with the extraction rule ID 4 is rejected for it is a descendant of the extraction rule with the extraction rule ID 3. On the other hand, when an extraction rule is judged to be accepted, its ancestor node may be accepted as well.

Having finished judging a link, the central processing unit updates the flag indicating whether or not a link has been checked in the data shown in FIG. 23 and deems the link checked (it updates the flag indicating whether or not a link has been checked included in the data shown in FIG. 23 to, for instance "1").

Next, the central processing unit functions as the extraction rule narrowing section 15, performing the narrowing-down processing until there is no unchecked link.

Example 4

Next, a fourth example of the present invention will be described. Note that an information extraction rule making support system according to the fourth example corresponds to the information extraction rule making support system described in the fourth mode of the present invention.

In the fourth example, the configuration of the information extraction rule making support system is identical to that of the information extraction rule making support system described in the third example. The fourth example differs from the third example in that the central processing unit functions as the extraction rule creating section 14 instead of the extraction rule input section 10.

Further, in the fourth example, the operations are the same as the processing described in the second example until the central processing unit creates the extraction rules, and the processing thereafter is identical to the processing described in the third example. Therefore, detailed explanations will be omitted.

Example 5

Next, a fifth example of the present invention will be described. Note that an information extraction rule making support system according to the fifth example corresponds to the information extraction rule making support system described in the fifth mode of the present invention.

In the fifth example, the configuration of the information extraction rule making support system is identical to that of the information extraction rule making support system described in the fourth example. The fifth example differs from the fourth example in that the central processing unit also functions as the extraction object selecting section 16.

Further, in the fifth example, the operations are the same as the processing described in the fourth example until the central processing unit functions as the extraction rule narrowing section 15, therefore detailed explanations will be omitted.

After functioning as the extraction rule narrowing section 15 and determining that the narrowing-down processing on the extraction rules has finished, the central processing unit functions as the extraction object selecting section, selecting an extraction object used in the instruction information for creating new extraction rules, based on the rule relation information. The central processing unit selects different information, compared to the information of the extraction place specified in the instruction information received by the extraction rule creating section 14 in the past, from the extraction results obtained by performing information extraction using the narrowed-down extraction rules. Further, all the past instruction information may be stored in the storage unit.

Next, if there is any selected information, the central processing unit shapes and displays the selected information and the information pertaining to an extraction object document that includes the selected information on the display device as the extraction object information. Examples of the information pertaining to the extraction object document that includes the selected information are, for instance, the extraction object document itself and information from which the extraction object document can be specified such as an extraction object document ID or a file name.

The extraction object information displayed on the display device may be displayed so that the user can select extraction objects as new instruction information. For instance, an example in FIG. 25 shows the extraction object information as a screen on which extraction objects can be selected. FIG. 25 shows a screen from which new instruction information can be inputted; the screen simultaneously displays a plurality of pieces of the selected information and sentences including the selected information, and enables the user to select the information by providing a checkbox for each piece of information. The information from which the extraction object document can be specified, such as the extraction object document ID corresponding to the selected information, does not have to be displayed on the screen. When information is selected on the selection screen of the extraction object information, the extraction object document ID corresponding to the selected information is given to the central processing unit functioning as the extraction rule creating section 14, and it becomes possible to use it as new instruction information.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

INDUSTRIAL APPLICABILITY

The present invention can be applied to use of an information extraction system that efficiently extracts information desired by the user from a large amount of electronic documents and a program that realizes the information extraction system on a computer. Further, it can also be applied to use of information search that searches for information required by the user.

The invention claimed is:

1. A information extraction rule making support system comprising:
    a storage section storing an extraction object document, which is an electronic document of an information extraction object;
    an input section inputting a plurality of extraction rules, which are rules used to extract information from said extraction object document;
    an information extraction section respectively deriving extraction results matching each of said extraction rules from said extraction object document stored by said storage section, using each of said extraction rules inputted by said input section; and
    a rule relation creating section creating a rule relation network indicating a relation between each of said extraction rules by analyzing an overlapping relation and including relation between extraction results derived by said information extraction and linking said extraction rules that the extraction results overlap or include, based on the result of the analysis;
    wherein said rule relation creating section derives an overlapping ratio indicating an overlapping relation between each of extraction results derived by said information extraction section, by analyzing an overlapping relation between said extraction results, and links corresponding extraction rules based on said overlapping ratio derived.

2. A information extraction rule making support system comprising:
    a storage section storing an extraction object document, which is an electronic document of an information extraction object;
    an input section inputting an document used to create extraction rules, which is an electronic document used to create extraction rules used to extract information from said extraction object document, and instruction information indicating an extraction place in the document used to create extraction rules;
    an extraction rule creating section creating a plurality of extraction rules used to extract information of an extraction place specified by said instruction information, based on said document used to create extraction rules and said instruction information inputted by said input section;
    an information extraction section respectively deriving extraction results matching each of said extraction rules from said extraction object document stored by said storage section, using each of said extraction rules created by said extraction rule creating section; and
    rule relation creating section creating a rule relation network indicating a relation between each of said extraction rules by analyzing an overlapping relation and including relation between extraction results derived by said information extraction section, and linking each of said extraction rules based on the result of the analysis;
    wherein said rule relation creating section derives an overlapping ratio indicating an overlapping relation between each of extraction results derived by said information extraction section, by analyzing an overlapping relation between said extraction results, and links corresponding extraction rules based on said overlapping ratio derived.

3. The information extraction rule making support system as defined in claim 1, wherein said rule relation creating section links corresponding extraction rules only when there is any including relation between each of extraction results derived by said information extraction section.

4. The information extraction rule making support system as defined in claim 1, comprising an output section outputting said rule relation network created by said rule relation creating section, as rule relation information indicating relations between extraction rules.

5. The information extraction rule making support system as defined in claim 1, comprising an output section outputting said rule relation network created by said rule relation creating section and information showing differences between extraction results corresponding to extraction rules linked in said rule relation network, as rule relation information indicating relations between extraction rules.

6. The information extraction rule making support system as defined in claim 1 comprising:
an extraction rule narrowing section narrowing down extraction rules;
wherein said extraction rule narrowing section
selects a link, included in said rule relation network created by said rule relation creating section, based on predetermined priority;
creates presentation information including results extracted by performing information extraction using each extraction rule corresponding to the selected link;
inputs judgment information indicating acceptability of each extraction result included in said presentation information; and
judges the acceptability of at least one extraction rule based on said judgment information inputted and said rule relation network.

7. The information extraction rule making support system as defined in claim 1 comprising:
extraction rule narrowing section narrowing down extraction rules;
wherein said extraction rule narrowing section
selects a link, included in said rule relation network created by said rule relation creating section, based on predetermined priority;
creates presentation information including at least information of results extracted using an extraction rule extracting more results when information extraction is performed using this extraction rule and not results extracted using another extraction rule extracting fewer results when information extraction is performed using this extraction rule, out of extraction rules corresponding to the selected link;
inputs judgment information indicating the acceptability of each extraction result included in said presentation information; and
judges the acceptability of at least one extraction rule based on said judgment information inputted and said rule relation network.

8. The information extraction rule making support system as defined in claim 6, wherein said extraction rule narrowing section selects an extraction rule based on the proportion of the number of extraction results corresponding to extraction rules linked in said rule relation network created by said rule relation creating section.

9. The information extraction rule making support system as defined in claim 6, wherein said extraction rule narrowing section selects an extraction rule based on the number of descendant nodes of extraction rules linked in said rule relation network created by said rule relation creating section.

10. The information extraction rule making support system as defined in claim 6, wherein said extraction rule narrowing section selects an extraction rule based on the proportion of the number of extraction results corresponding to extraction rules linked in said rule relation network created by said rule relation creating section, and a score value calculated using the number of descendant nodes of extraction rules linked in said rule relation network.

11. The information extraction rule making support system as defined in claim 6, comprising information selecting section selecting information, different from information of an extraction place specified by instruction information in the past, from results extracted by performing information extraction using extraction rules judged acceptable by said extraction rule narrowing section;
wherein said information selecting section has a function of outputting an extraction object document including the selected information and information from which an extraction object document that includes the selected information can be specified.

12. An information extraction rule making support method comprising:
storing an extraction object document, which is an electronic document of an information extraction object, in a storage unit;
inputting a plurality of extraction rules, which are rules used to extract information from said extraction object document;
respectively deriving extraction results matching each of said extraction rules from said extraction object document stored by said storage unit, using each of said extraction rules inputted; and
creating a rule relation network indicating a relation between each of said extraction rules by analyzing an overlapping relation and including relation between extraction results derived and linking said extraction rules that the extraction results overlap or include, based on the result of the analysis;
wherein said rule relation network derives an overlapping ratio indicating an overlapping relation between each of extraction results derived by said information extraction section, by analyzing an overlapping relation between said extraction results, and links corresponding extraction rules based on said overlapping ratio derived.

13. An information extraction rule making support method comprising:
storing an extraction object document, which is an electronic document of an information extraction object, in a storage unit;
inputting an document used to create extraction rules, which is an electronic document used to create extraction rules used to extract information from said extraction object document, and instruction information indicating an extraction place in the document used to create extraction rules;
creating a plurality of extraction rules used to extract information of an extraction place specified by said instruction information, based on said document used to create extraction rules and said instruction information inputted;
respectively deriving extraction results matching each of said extraction rules from said extraction object document stored by said storage unit, using each of said extraction rules created; and creating a rule relation network indicating a relation between each of said extraction rules by analyzing an overlapping relation and including relation between extraction results derived and linking each of said extraction rules based on the result of the analysis;

wherein said rule relation network derives an overlapping ratio indicating an overlapping relation between each of extraction results derived by said information extraction section, by analyzing an overlapping relation between said extraction results, and links corresponding extraction rules based on said overlapping ratio derived.

14. The information extraction rule making support method as defined in claim 12, wherein, when said rule relation network is created, corresponding extraction rules are linked only if there is any including relation between each of extraction results derived.

15. The information extraction rule making support method as defined in claim 12, comprising: outputting said rule relation network created as rule relation information indicating relations between extraction rules.

16. The information extraction rule making support method as defined in claim 12, comprising: outputting said rule relation network created and information showing differences between extraction results corresponding to extraction rules linked in said rule relation network as rule relation information indicating relations between extraction rules.

17. The information extraction rule making support method as defined in claim 12, comprising: narrowing down extraction rules; wherein when extraction rules are narrowed down,
- a link included in said rule relation network created is selected based on predetermined priority;
- presentation information including results extracted by performing information extraction using each extraction rule corresponding to the selected link is created;
- judgment information indicating the acceptability of each extraction result included in said presentation information is inputted; and
- the acceptability of at least one extraction rule is judged based on said judgment information inputted and said rule relation network.

18. The information extraction rule making support method as defined in claim 12, comprising: narrowing down extraction rules; wherein when extraction rules are narrowed down,
- a link included in said rule relation network created is selected based on predetermined priority;
- presentation information including results extracted by performing information using each extraction rule corresponding to the selected link, is created;
- judgment information indicating the acceptability of each extraction result included in said presentation information is inputted; and
- the acceptability of at least one extraction rule is judged based on said judgment information inputted and said rule relation network.

* * * * *